(12) United States Patent
Minoura et al.

(10) Patent No.: US 7,586,559 B2
(45) Date of Patent: Sep. 8, 2009

(54) DISPLAY UNIT

(75) Inventors: Kiyoshi Minoura, Nara (JP); Masahiro Shimizu, Kizugawa (JP); Hisashi Watanabe, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 111 days.

(21) Appl. No.: 11/887,162

(22) PCT Filed: Mar. 28, 2006

(86) PCT No.: PCT/JP2006/306330
§ 371 (c)(1),
(2), (4) Date: Sep. 26, 2007

(87) PCT Pub. No.: WO2006/104159
PCT Pub. Date: Oct. 5, 2006

(65) Prior Publication Data
US 2009/0051848 A1    Feb. 26, 2009

(30) Foreign Application Priority Data
Mar. 29, 2005    (JP) .............................. 2005-094424

(51) Int. Cl.
G02F 1/13357    (2006.01)
C09K 19/02    (2006.01)
(52) U.S. Cl. .................. 349/62; 349/71; 349/167; 349/178
(58) Field of Classification Search ........... 349/71
See application file for complete search history.

(56) References Cited
U.S. PATENT DOCUMENTS
7,115,307 B2 * 10/2006 Dubois et al. ............... 428/1.3

2004/0196230 A1    10/2004  Nose et al.
2005/0018272 A1    1/2005   Kimura

FOREIGN PATENT DOCUMENTS
JP    59-058421    4/1984

(Continued)

OTHER PUBLICATIONS
Gao et al., "Strongly Photoluminescent CdTe Nanocrystals by Proper Surface Modification," *J. Phys. Chem. B* 1998, pp. 8360-8363.

(Continued)

*Primary Examiner*—Omar Rojas
(74) *Attorney, Agent, or Firm*—Nixon & Vanderhye, P.C.

(57) ABSTRACT

The display device according to the present invention includes: a liquid crystal layer 12 having a first principal face and a second principal face opposing each other; a plurality of electrodes 14a and 14b; a fluorophore layer provided on the first principal face side of the liquid crystal layer; and an illuminator for emitting light for exciting the fluorophore layer toward the second principal face of the liquid crystal layer. When a predetermined voltage is applied, the liquid crystal layer forms an intermediate layer containing liquid crystal molecules which are oriented in a different direction from that of liquid crystal molecules in an anchoring layer near the second principal face, and causes linearly-polarized light which has been transmitted through the anchoring layer near the second principal face to be refracted toward the second principal face in or near the intermediate layer. Displaying is conducted by using light emitted by the fluorophore layer while no voltage is applied across the liquid crystal layer, and black displaying is conducted while a voltage is applied across the liquid crystal layer.

18 Claims, 19 Drawing Sheets

FOREIGN PATENT DOCUMENTS

| | | |
|---|---|---|
| JP | 63-116121 | 5/1988 |
| JP | 2000-171813 | 6/2000 |
| JP | 2003-29170 | 1/2003 |
| JP | 2003-195261 | 7/2003 |
| WO | 2006-104160 | 10/2006 |

OTHER PUBLICATIONS

Heikenfeld et al., "Demonstration of Fluorescent RGB Electrowetting Devices for Light Wave Coupling Displays," 2004, pp. 1-4.

Heikenfeld et al., "P-59: A Novel Fluorescent Display Using Light Wave Coupling Technology," 2004, pp. 470-473.

International Search Report for PCT/JP2006/306330 mailed Jul. 4, 2006.

English translation of the International Preliminary Report of Patentability mailed Nov. 22, 2007 in corresponding PCT Application No. PCT/JP2006/306330.

* cited by examiner

DISPLAY UNIT

This application is the U.S. national phase of International Application No. PCT/JP2006/306330, filed 28 Mar. 2006, which designated the U.S. and claims priority to Japanese Patent Application No. 2005-094424, filed 29 Mar. 2005, the entire contents of each of which are hereby incorporated by reference.

TECHNICAL FIELD

The present invention relates to a display device, and in particular to a display device incorporating a liquid crystal layer.

BACKGROUND ART

As flat panel displays featuring thinness, light weight, etc., liquid crystal display devices have recently been used widely for liquid crystal television devices, monitor devices, mobile phones, and the like. However, the liquid crystal display devices which are now used most widely are of a type that uses one or two polarizers, which invites the problem of low efficiency of light utilization.

As displaying methods which do not use polarizers, a method utilizing a guest-host liquid crystal and a method utilizing a polymer dispersed liquid crystal have been proposed in the past. However, because of disadvantages such as a low contrast ratio and a high driving voltage, these methods are yet to be put to practical use.

Furthermore, as another displaying method which does not use polarizers, a method of controlling total reflection/transmission at an interface between a liquid crystal layer and a substrate or a light guiding plate (hereinafter referred to as "total-reflection type") has been proposed.

For example, Patent Document 1 discloses a display device which, by varying the orientation state of a liquid crystal layer, switches between a state where light propagating through a light guiding plate which is disposed adjacent to the liquid crystal layer is totally reflected at an interface between the liquid crystal layer and the light guiding plate or a state where it is transmitted, thus conducting black displaying in the total reflection state or conducting white displaying in the transmitting state. White displaying is realized by allowing the light which is emitted from the light guiding plate to be scattered by a scattering plate. A liquid crystal display device disclosed in Patent Document 2 includes a light guide, a liquid crystal layer, and a reflective film in this order, and by varying the orientation state of the liquid crystal layer, switches between a state where light entering the liquid crystal layer from the light guide is totally reflected at an interface between the liquid crystal layer and the light guide or a state where it is transmitted, and conducts white displaying by reflecting light which has been transmitted through the interface toward a viewer with a reflective film. Furthermore, Patent Document 3 discloses a display device which, by using as a light guiding plate a transparent substrate containing a fluorophore, conducts displaying by switching between a state of totally reflecting fluorescence which is emitted from the light guiding plate or a state where it is transmitted, in a manner similar to Patent Document 1.

[Patent Document 1] Japanese Laid-Open Patent Publication No. 59-58421
[Patent Document 2] Japanese Laid-Open Patent Publication No. 2000-171813
[Patent Document 3] Japanese Laid-Open Patent Publication No. 63-116121

DISCLOSURE OF INVENTION

Problems to be Solved by the Invention

The total-reflection type display devices which are disclosed in Patent Documents 1 to 3 change the orientation state of the liquid crystal layer as a way of switching between a state where light is totally reflected at an interface between the liquid crystal layer and the light guide adjacent to the liquid crystal layer or a state where it is transmitted, thus resulting in a problem of high driving voltage. The orientations of the liquid crystal molecules near the interface of the liquid crystal layer are restricted by a surface (typically an alignment film) which the liquid crystal molecules are in contact with, and do not change unless a relatively high voltage is applied. A layer composed of the liquid crystal molecules near the interface, which are unwilling to respond to voltage (having a thickness on the order of several hundred nm), is generally referred to as an anchoring layer. In order to change the orientations of the liquid crystal molecules in the anchoring layer, a voltage of several ten volts to several hundred volts is necessary, for example.

It is impossible to industrially produce an active matrix type display device by using transistors that operate with such a high voltage.

The present invention has been made in view of the above problems. A main objective of the present invention is to provide a display device which, without requiring a high driving voltage as does a conventional total-reflection type display device, presents display by changing the orientation state of a liquid crystal layer, thus switching between a transmitting state or a non-transmitting state for light entering the liquid crystal layer.

MEANS FOR SOLVING THE PROBLEMS

A display device according to the present invention comprises: a liquid crystal layer having a first principal face and a second principal face opposing each other; a plurality of electrodes for applying a voltage across the liquid crystal layer; a fluorophore layer provided on the first principal face side of the liquid crystal layer; and an illuminator for emitting light for exciting the fluorophore layer toward the second principal face of the liquid crystal layer, characterized in that, when a predetermined voltage is applied, the liquid crystal layer forms an intermediate layer containing liquid crystal molecules which are oriented in a different direction from that of liquid crystal molecules in an anchoring layer near the second principal face, and causes linearly-polarized light which has been transmitted through the anchoring layer near the second principal face to be refracted toward the second principal face in or near the intermediate layer; and displaying is conducted by using light emitted by the fluorophore layer while no voltage is applied across the liquid crystal layer, and black displaying is conducted while a voltage is applied across the liquid crystal layer.

In one embodiment, a refractive index of the intermediate layer with respect to the linearly-polarized light which has been transmitted through the anchoring layer is smaller than a refractive index of the anchoring layer.

In one embodiment, the linearly-polarized light which is emitted from the illuminator toward the second principal face has a component which is parallel to major axes of the liquid crystal molecules in the anchoring layer.

In one embodiment, the liquid crystal layer is a vertical-alignment type liquid crystal layer containing liquid crystal molecules having positive dielectric anisotropy; the plurality of electrodes are a plurality of electrodes for applying a lateral electric field across the liquid crystal layer; and the linearly-polarized light is p-polarized light.

In one embodiment, the liquid crystal layer is a vertical-alignment type liquid crystal layer containing liquid crystal molecules having negative dielectric anisotropy; the plurality of electrodes are a plurality of electrodes disposed so as to oppose each other via the liquid crystal layer; and the linearly-polarized light is p-polarized light.

In one embodiment, the liquid crystal layer is a horizontal-alignment type liquid crystal layer containing liquid crystal molecules having positive dielectric anisotropy; the plurality of electrodes are a plurality of electrodes for applying a lateral electric field across the liquid crystal layer; and the linearly-polarized light is s-polarized light.

In one embodiment, the liquid crystal layer is a horizontal-alignment type liquid crystal layer containing liquid crystal molecules having positive dielectric anisotropy; the plurality of electrodes are a plurality of electrodes disposed so as to oppose each other via the liquid crystal layer; and the linearly-polarized light is s-polarized light.

In one embodiment, a reflective layer is comprised on the opposite side of the fluorophore layer from the liquid crystal layer.

In one embodiment, the reflective layer is a retroreflective layer.

In one embodiment, a light absorbing layer is further comprised on the opposite side of the fluorophore layer from the liquid crystal layer.

In one embodiment, the illuminator includes a light source and a light guiding plate.

In one embodiment, the illuminator further includes a polarization-selective film between the light source and the light guiding plate.

In one embodiment, the illuminator further includes a reflective layer disposed so as to oppose the light source via the light guiding plate.

In one embodiment, the illuminator further includes a ¼ wavelength plate between the reflective layer and the light guiding plate.

In one embodiment, the fluorophore layer is disposed on a front face side of the liquid crystal layer, and the illuminator is disposed on a rear face side of the liquid crystal layer.

In one embodiment, the illuminator includes: a light guiding plate of a parallel plate type, having a plurality of holes on a rear face thereof; a reflecting structure provided in each of the plurality of holes; and a plurality of light sources each emitting light toward the reflecting structure.

In one embodiment, a light absorbing layer is further comprised on the rear face side of the light guiding plate.

In one embodiment, a layer having a lower refractive index than that of the light guiding plate is provided between the light guiding plate and the light absorbing layer.

EFFECTS OF THE INVENTION

A liquid crystal layer of the display device according to the present invention causes linearly-polarized light that has been transmitted through an anchoring layer to be refracted at an intermediate layer while a predetermined voltage is applied, thus allowing the light to be refracted back in its incident direction. The liquid crystal layer acts as if to totally reflect the incident linearly-polarized light. In the display device according to the present invention, it is only necessary that the refractive index of the intermediate layer in the liquid crystal layer with respect to the linearly-polarized light be different from the refractive index of the anchoring layer; that is, the orientation state of the anchoring layer does not need to change. Thus, the display device according to the present invention is capable of presenting display by switching between a transmitting state and a non-transmitting state with respect to light entering the liquid crystal layer, with a voltage which is low enough to permit use of conventional transistors.

By utilizing the aforementioned function of the liquid crystal layer, the display device according to the present invention controls the excitation light which enters the fluorophore layer, thus presenting display by utilizing fluorescence.

DESCRIPTION OF THE REFERENCE NUMERALS

| | |
|---|---|
| 12, 512 | liquid crystal layer |
| 12a, 512a | anchoring layer |
| 12b, 512b | intermediate layer |
| 14a, 14b, 514a, 414 | belectrode |
| 16 | light guiding plate |
| 18 | reflector |
| 18a | oblique reflective layer |
| 116 | front substrate (light guiding plate) |
| 117 | rear substrate |
| 120 | light absorbing layer |
| 518 | fluorophore layer |
| 530 | illuminator |
| 532 | light source |

BEST MODE FOR CARRYING OUT THE INVENTION

Hereinafter, the construction and operation display devices according to embodiments of the present invention will be described with reference to the drawings.

First, the operation principles of the display device according to the present invention will be described in comparison with the aforementioned conventional total-reflection type liquid crystal display device.

Figure 16:
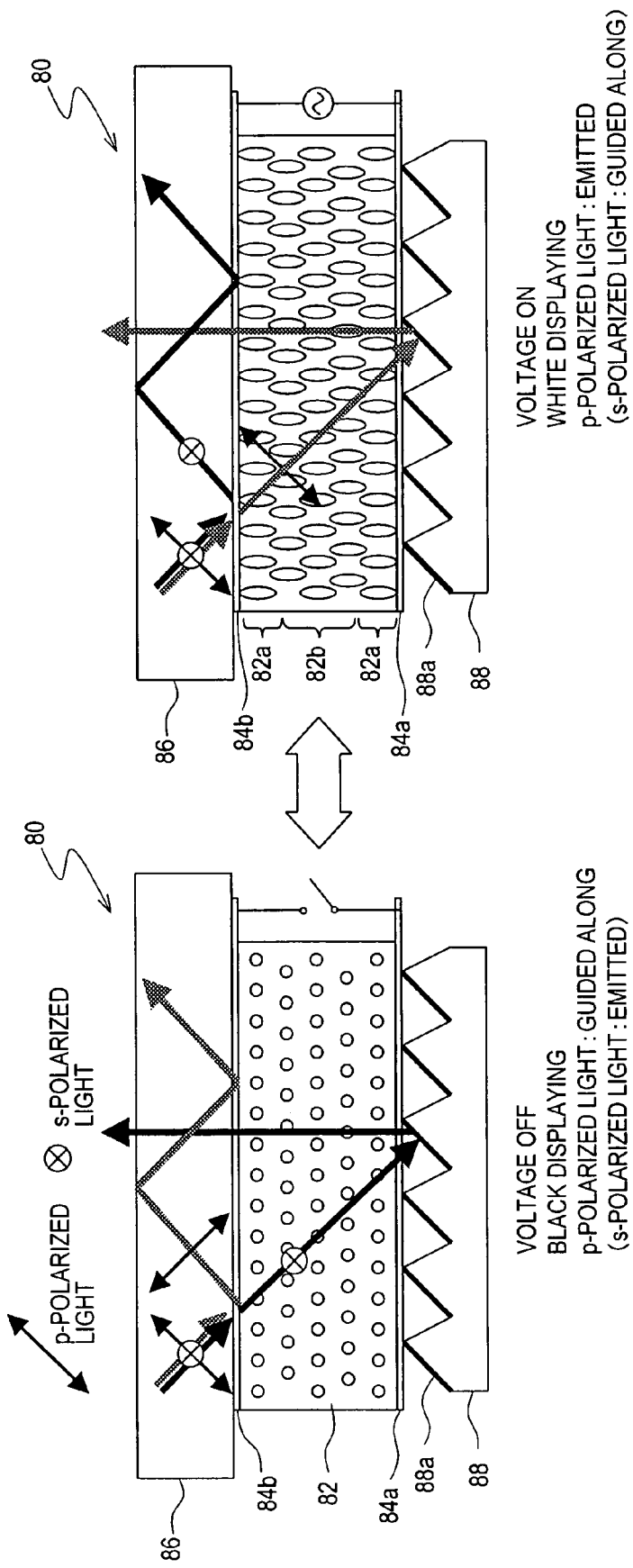
FIG. 16 A schematic diagram for explaining the operation of a conventional total-reflection type liquid crystal display device 80.

FIG. 16 is a schematic diagram for explaining the operation of a conventional total-reflection type liquid crystal display device 80, where the left-hand side shows a state in the absence of an applied voltage (voltage OFF), and the right-hand side shows a state under an applied voltage (voltage ON). The liquid crystal display device described in Patent Document 1, supra, operates in a similar manner to the liquid crystal display device 80.

The liquid crystal display device 80 includes: a liquid crystal layer 82 of a horizontal-alignment type; electrodes 84a and 84b for applying a voltage across the liquid crystal layer 82; a light guiding plate 86 disposed adjacent to the liquid crystal layer 82 and on the viewer's side (which may also be referred to as the "front face side") of the liquid crystal layer 82; and a reflector 88 disposed on the opposite side from the viewer's side of the liquid crystal layer 82 (which may also be referred to as the "rear face side"). The reflector 88 includes oblique reflective layers 88a which are slanted with respect to the display surface (liquid crystal layer plane), and reflects light which has been transmitted through the liquid crystal layer 82 toward the front face side.

Light (containing p-polarized light and s-polarized light) which is emitted from a light source (not shown) propagates within the light guiding plate 86. Herein, a refractive index ns of the light guiding plate 86 is prescribed to be approximately equal to an extraordinary refractive index ne of the liquid crystal molecules composing the liquid crystal layer 82 ($=n_\parallel$: a refractive index along a direction which is parallel to the major axis of the liquid crystal molecules) (ns≈ne). The liquid crystal molecules composing the liquid crystal layer 82 have positive dielectric anisotropy ($\Delta\varepsilon > 0$), with the relationship ne>no (where no is an ordinary refractive index ($=n_\perp$: a refractive index along a direction which is orthogonal to the major axis of the liquid crystal molecules)).

Paying attention to p-polarized light, the refractive index of the liquid crystal layer 82 with respect to the p-polarized light propagating within the light guiding plate 86 is no in the absence of an applied voltage (left-hand side in the figure). Therefore, the p-polarized light is totally reflected at the interface between the light guiding plate 86 and the liquid crystal layer 82 satisfying the relationship ns≠no, and propagates within the light guiding plate 86 without entering into the liquid crystal layer 82. On the other hand, under an applied voltage (right-hand side in the figure), the refractive index of the liquid crystal layer 82 with respect to the p-polarized light propagating within the light guiding plate 86 is approximately ne. Therefore, the p-polarized light is transmitted through the liquid crystal layer 82, without being totally reflected at the interface between light guiding plate 86 and the liquid crystal layer 82 satisfying the relationship ns≈one. The light having been transmitted through the liquid crystal layer 82 is reflected by the oblique reflective layers 88a so as to be emitted toward the viewer's side. By thus using p-polarized light, it is possible to conduct black displaying in a voltage-OFF state or white displaying in a voltage-ON state.

However, in order to eliminate reflection at the interface between the light guiding plate 86 and the liquid crystal layer 82, it is necessary to not only align the liquid crystal molecules in an intermediate layer 82b which is located intermediate along the thickness direction of the liquid crystal layer 82, but also essentially perpendicularly align the liquid crystal molecules in an anchoring layer 82a near the interface on the light guiding plate 86 side. Since a voltage as high as several ten volts or more is necessary for changing the orientations of the liquid crystal molecules in the anchoring layer 82a, it is impossible to industrially produce an active matrix type display device employing transistors.

Paying attention to s-polarized light, the refractive index of the liquid crystal layer 82 with respect to the s-polarized light propagating within the light guiding plate 86 is ne in the absence of an applied voltage. Therefore, the s-polarized light is transmitted through the liquid crystal layer 82 without being totally reflected at the interface between the light guiding plate 86 and the liquid crystal layer 82 satisfying the relationship ns≈ne, and thereafter is reflected by the oblique reflective layers 88a so as to be emitted toward the viewer's side. On the other hand, under an applied voltage, the refractive index of the liquid crystal layer 82 with respect to s-polarized light is no (≠ns), and therefore the s-polarized light is totally reflected at the interface between the light guiding plate 86 and the liquid crystal layer 82. This is opposite to the aforementioned behavior of p-polarized light. Therefore, although not described in Patent Document 1, it is necessary to eliminate the s-polarized light in order to perform the aforementioned displaying operation by using p-polarized light.

Next, with reference to FIG. 17, the operation of another conventional total-reflection type liquid crystal display device 90 will be described. The liquid crystal display devices described in Patent Documents 2 and 3, supra, operate in similar manners to the liquid crystal display device 90.

Figure 14:
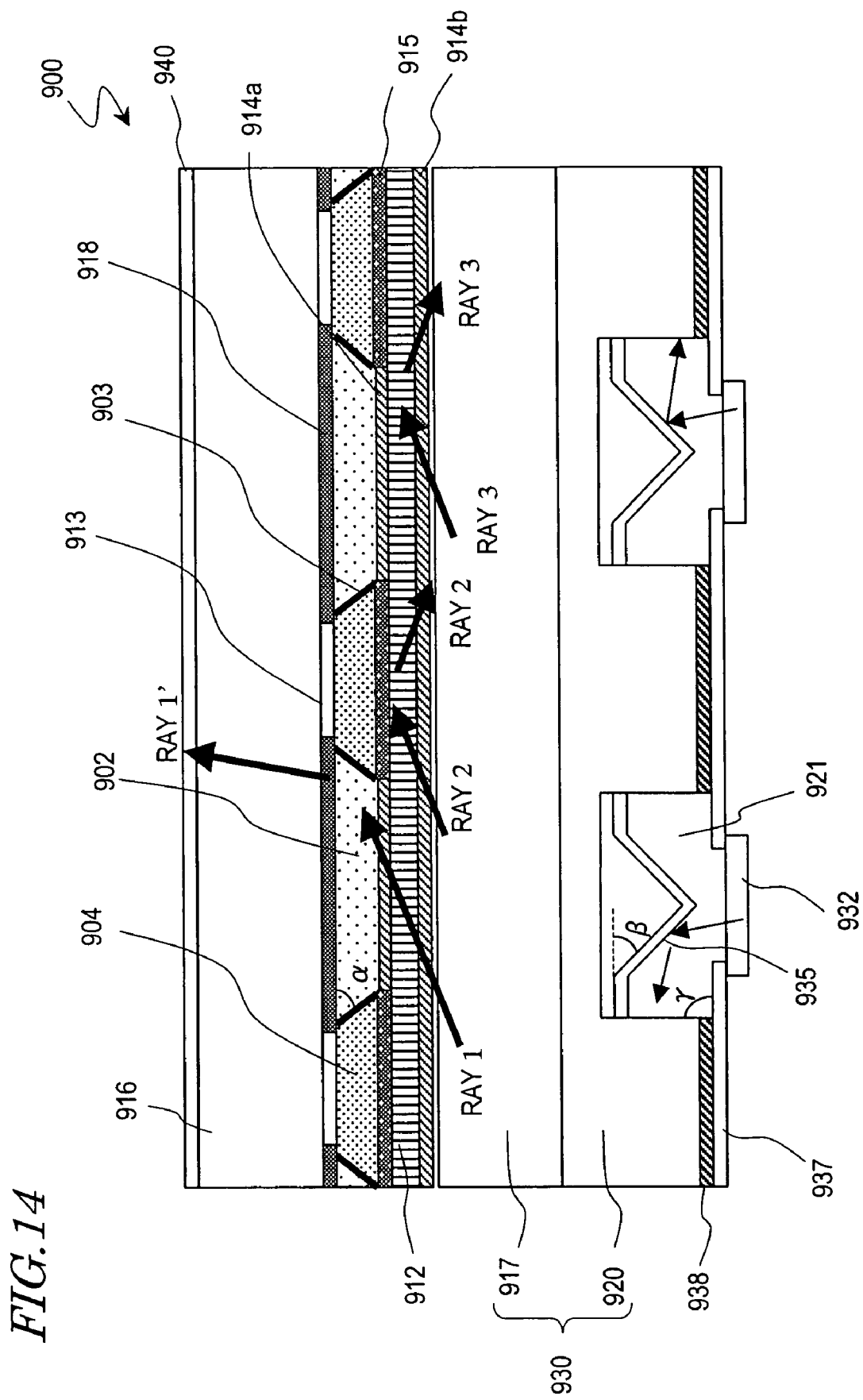
FIG. 14 A schematic diagram for explaining the construction and operation of still another fluorescent display device 900 according to an embodiment of the present invention.

The liquid crystal display device 90 differs from the liquid crystal display device 80 in that it includes a vertical-alignment type liquid crystal layer 92 as the liquid crystal layer. In FIG. 14, constituent elements having the same functions as those of the constituent elements of the liquid crystal display device 80 are denoted by the same reference numerals, and the descriptions thereof are omitted herein.

The liquid crystal molecules in the liquid crystal layer 92 have the same refractive indices (ne and no) as those of the liquid crystal molecules in the liquid crystal layer 82, such that the refractive index ns of the light guiding plate 86 is prescribed to be approximately equal to the extraordinary refractive index ne (=n∥) of the liquid crystal molecules composing the liquid crystal layer 82 (ns≈ne). However, the liquid crystal molecules in the liquid crystal layer 92 have negative dielectric anisotropy.

Figure 17:
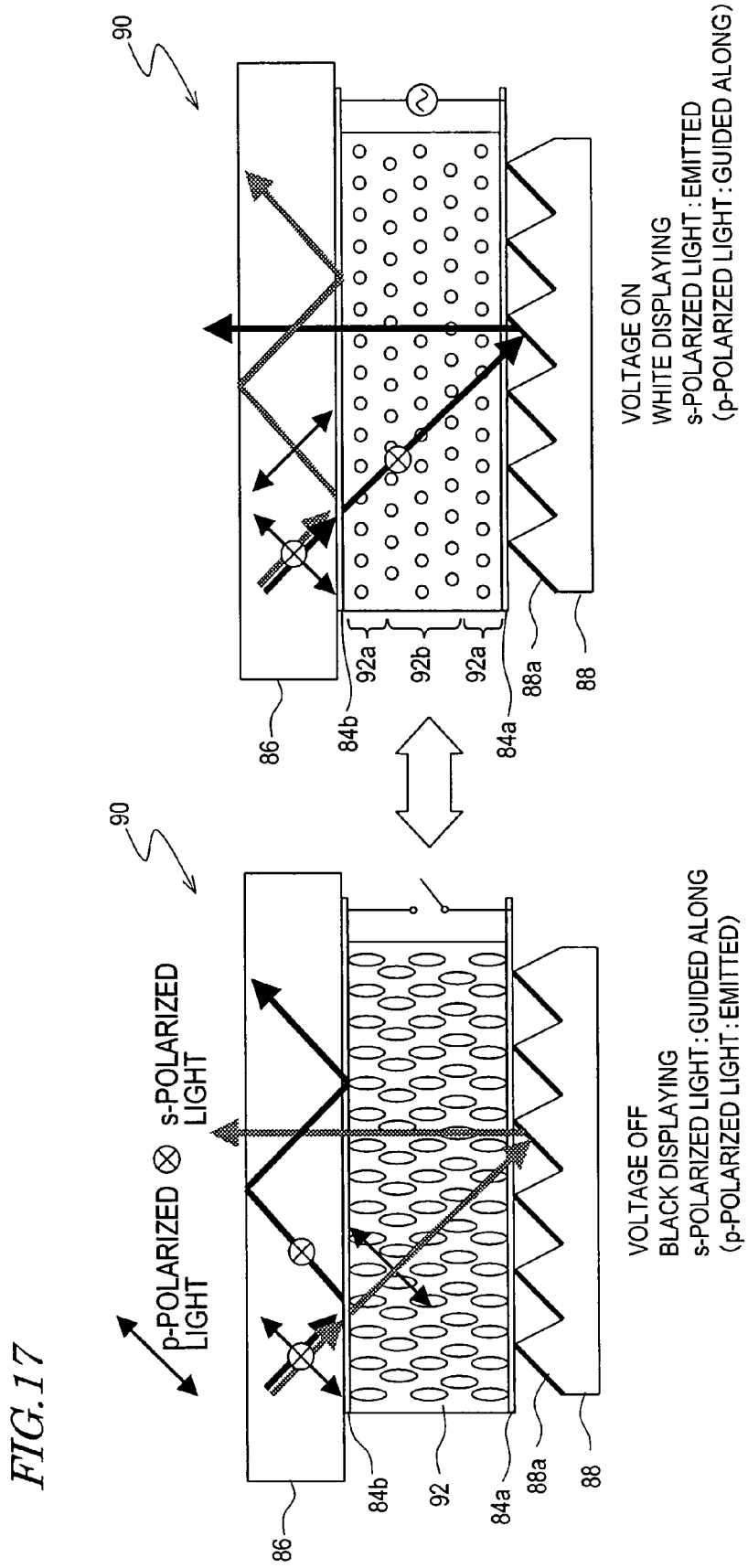
FIG. 17 A schematic diagram for explaining the operation of another conventional total-reflection type liquid crystal display device 90.

As shown on the left-hand side of FIG. 17, the liquid crystal molecules in the liquid crystal layer 92 are perpendicularly aligned in the absence of an applied voltage, and the refractive index of the liquid crystal layer 92 with respect to the s-polarized light propagating within the light guiding plate 86 is no in the absence of an applied voltage. Therefore, the s-polarized light is totally reflected at the interface between the light guiding plate 86 and the liquid crystal layer 92 satisfying the relationship ns≠no, and propagates within the light guiding plate 86 without entering into the liquid crystal layer 92. On the other hand, under an applied voltage (right-hand side in the FIGURE), the refractive index of the liquid crystal layer 92 with respect to the s-polarized light propagating within the light guiding plate 86 is approximately ne. Therefore, the s-polarized light is transmitted through the liquid crystal layer 92, without being totally reflected at the interface between the light guiding plate 86 and the liquid crystal layer 92 satisfying the relationship ns≈ne. The light having been transmitted through the liquid crystal layer 92 is reflected by the oblique reflective layers 88a so as to be emitted toward the viewer's side. Thus, by using s-polarized light, it is possible to conduct black displaying in a voltage-OFF state or white displaying in a voltage-ON state.

In the liquid crystal display device 90, too, in order to eliminate reflection at the interface between the light guiding plate 86 and the liquid crystal layer 92, it is necessary to not only align the liquid crystal molecules in an intermediate layer 92b which is located intermediate along the thickness direction of the liquid crystal layer 92, but also essentially horizontally align the liquid crystal molecules in an anchoring layer 92a near the interface on the light guiding plate 86 side. Since a voltage as high as several ten volts or more is necessary for changing the orientations of the liquid crystal molecules in the anchoring layer 92a, it is impossible to industrially produce an active matrix type display device employing transistors.

Paying attention to p-polarized light, the refractive index of the liquid crystal layer 92 with respect to the p-polarized light propagating within the light guiding plate 86 is ne in the absence of an applied voltage. Therefore, the p-polarized light is transmitted through the liquid crystal layer 92 without being totally reflected at the interface between the light guiding plate 86 and the liquid crystal layer 92 satisfying the relationship ns≈ne, and thereafter is reflected by the oblique reflective layers 88a so as to be emitted toward the viewer's side. On the other hand, under an applied voltage, the refractive index of the liquid crystal layer 92 with respect to p-polarized light is no (≠ns), and therefore the p-polarized light is totally reflected at the interface between the light guiding plate 86 and the liquid crystal layer 92. This is opposite to the aforementioned behavior of s-polarized light. Therefore, although not described in Patent Documents 2 and 3, it is necessary to eliminate the p-polarized light in order to perform the aforementioned displaying operation by using s-polarized light.

Unlike in the aforementioned conventional total-reflection type liquid crystal display devices, in the liquid crystal display devices according to embodiments of the present invention, the liquid crystal layer causes linearly-polarized light that has been transmitted through an anchoring layer to be refracted at an intermediate layer while a predetermined voltage is applied, thus allowing the light to be refracted back in its incident direction. The liquid crystal layer acts as if to totally reflect the incident linearly-polarized light. In the liquid crystal display devices according to embodiments of the present invention, it is only necessary that the refractive index of the intermediate layer in the liquid crystal layer with respect to the linearly-polarized light be different from the refractive index of the anchoring layer; that is, the orientation state of the anchoring layer does not need to change. Thus, liquid crystal display devices according to embodiments of the present invention can be driven with a voltage which is low enough to permit use of conventional transistors. Moreover, a liquid crystal display device according to the present invention displays white while no voltage is applied across the liquid crystal layer, or conducts black displaying while a voltage is applied across the liquid crystal layer.

With reference to FIG. 1A, FIG. 1B, FIG. 2, and FIG. 3, the construction and operation of a liquid crystal display device according to an embodiment of the present invention will be described in detail.

Figure 1A:
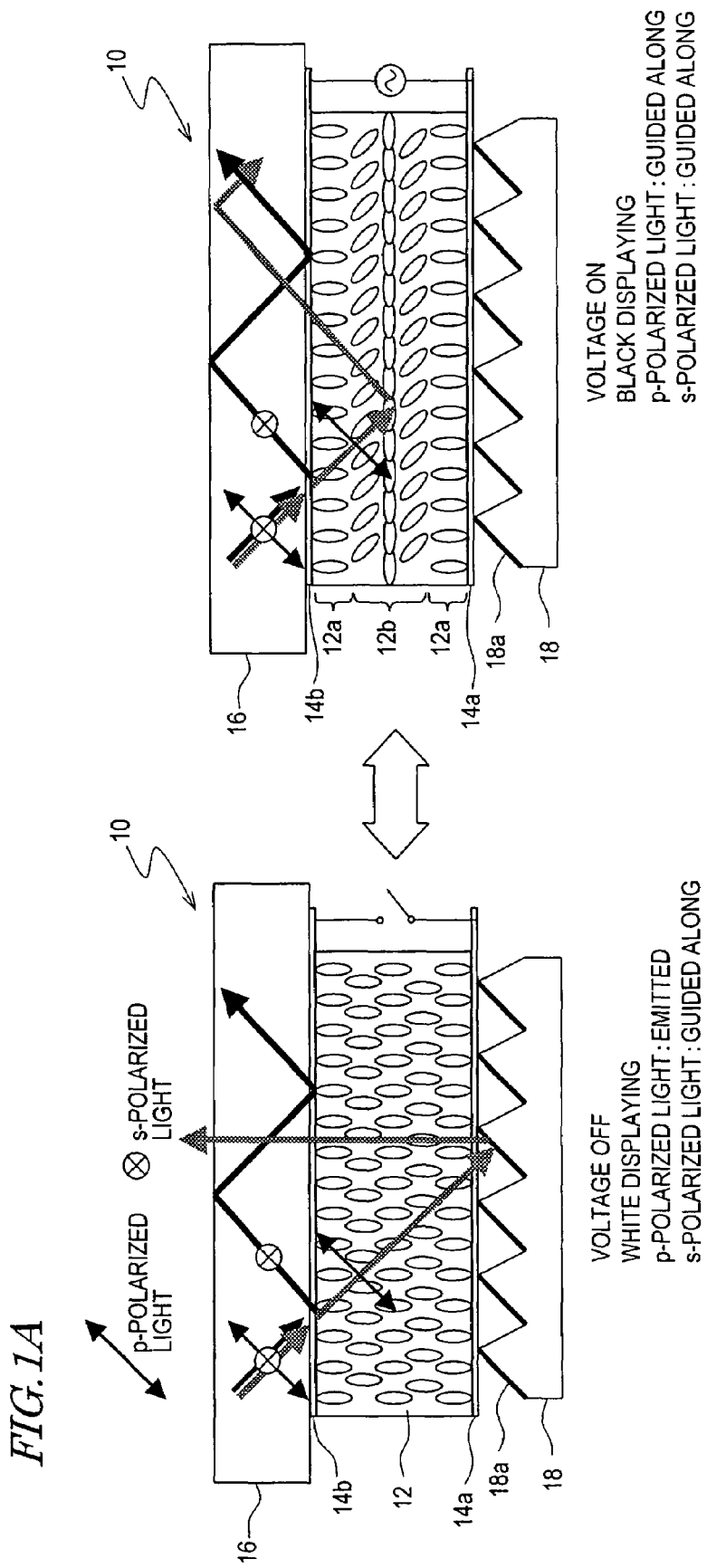
FIG. 1A A schematic diagram for explaining the construction and operation of a liquid crystal display device 10 according to an embodiment of the present invention.

The liquid crystal display device 10 of the embodiment shown in FIG. 1A includes: a vertical-alignment type liquid crystal layer 12; electrodes 14a and 14b for applying a voltage across the liquid crystal layer 12; a light guiding plate 16 disposed on the front face side of the liquid crystal layer 12 and adjacent to the liquid crystal layer 12; and a reflector 18 disposed on the rear face side of the liquid crystal layer 12. The reflector 18 includes oblique reflective layers 18a which are slanted with respect to the display surface (liquid crystal layer plane), and reflects light which has been transmitted through the liquid crystal layer 12 toward the front face side.

Light (containing p-polarized light and s-polarized light) which is emitted from a light source (not shown) propagates within the light guiding plate 16. Herein, a refractive index ns of the light guiding plate 16 is prescribed to be approximately equal to an extraordinary refractive index ne (=n∥) of the liquid crystal molecules composing the liquid crystal layer 12 (ns≈ne). The liquid crystal molecules composing the liquid crystal layer 12 have negative dielectric anisotropy (Δ∈<0) and positive refractive index anisotropy (ne>no).

Paying attention to p-polarized light, the refractive index of the liquid crystal layer 12 with respect to the p-polarized light propagating within the light guiding plate 16 is approximately ne in the absence of an applied voltage (left-hand side in the FIGURE). Therefore, the p-polarized light is transmitted through the liquid crystal layer 12, without being totally reflected at the interface between the light guiding plate 16 and the liquid crystal layer 12 satisfying the relationship ns≈ne. The light which has been transmitted through the liquid crystal layer 12 is reflected by the oblique reflective layers 18a so as to be emitted toward the viewer's side.

On the other hand, under an applied voltage (right-hand side in the FIGURE), a voltage which is lower than those in the above-described conventional techniques is applied. Therefore, the orientation state of anchoring layers 12a does not change, but only the orientation state of an intermediate layer 12b changes. Hence, also under an applied voltage, the refractive index of the anchoring layers 12a with respect to p-polarized light is approximately ne, and the p-polarized light enters the liquid crystal layer 12 without being totally reflected at the interface between the light guiding plate 16 and the liquid crystal layer 12 satisfying the relationship ns≈ne. The refractive index with respect to the p-polarized light gradually decreases from the anchoring layers 12a toward the intermediate layer 12b, and approaches no. In or near the intermediate layer 12b where the refractive index changes, the p-polarized light is gradually refracted so as to be directed toward the front face side. This action of the liquid crystal layer 12 makes the p-polarized light appear as if totally reflected within the liquid crystal layer 12 (this phenomenon is similar to seeing a mirage). The light which has been refracted within the liquid crystal layer 12 and directed toward the light guiding plate 16 propagates within the light guiding plate 16, and is not emitted toward the viewer's side. Note that, since the incident angle of the light which is used for displaying has a tilt of 0° to 20° (essentially horizontal) with respect to the interface, a similar action can be obtained even if the tilting direction of the liquid crystal molecules is not in the illustrated direction.

Thus, by using p-polarized light, the liquid crystal display device 10 is able to conduct white displaying in a voltage-OFF state or conduct black displaying in a voltage-ON state.

Note that, in the liquid crystal display device 10, s-polarized light is totally reflected at the interface between the light guiding plate 16 and the liquid crystal layer 12, irrespective of whether the voltage is ON or OFF. The reason is that the refractive index of the anchoring layers 12a of the liquid crystal layer 12 with respect to s-polarized light is no (≠ns), irrespective of whether the voltage is ON or OFF. Therefore, unlike in the above-described conventional techniques, it is unnecessary to separately provide any construction for eliminating the polarized light which is not used for displaying.

Figure 1B:
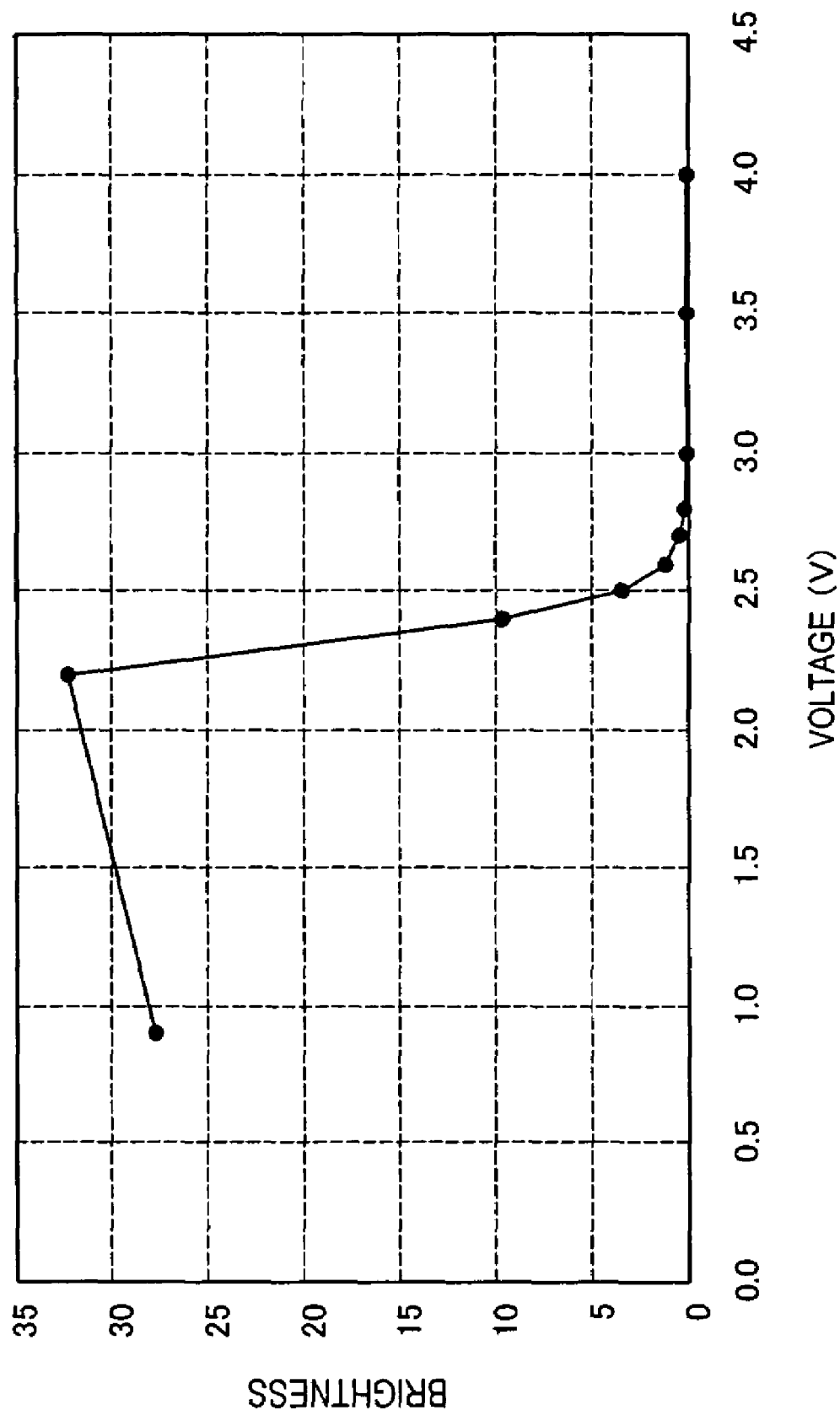
FIG. 1B A graph showing brightness, against driving voltage, of the liquid crystal display device 10 according to an embodiment of the present invention.

FIG. 1B shows a relationship between the driving voltage and brightness of the liquid crystal display device 10 shown in FIG. 1A. As is clear from FIG. 1B, the liquid crystal display device 10 can be driven with a voltage of 4 volts or less. Thus, the liquid crystal display device 10 presents display by utilizing "refraction" within the liquid crystal layer 12 by applying a voltage which does not change the orientation state of the anchoring layers 12a, and therefore can be driven with a voltage which is low enough to permit use of conventional transistors.

Next, with reference to FIG. 2, the construction and operation of another liquid crystal display device 20 according to an embodiment of the present invention will be described. In the following FIGURES, constituent elements having the same functions as those of the constituent elements of the liquid crystal display device 10 shown in FIG. 1A will be denoted by the same reference numerals, and the descriptions thereof will be omitted.

A liquid crystal layer 22 of the liquid crystal display device 20 is composed of the same liquid crystal molecules as those of the liquid crystal layer 12 of the liquid crystal display device 10. However, regarding the direction in which the liquid crystal molecules fall when a voltage is applied, it is parallel to the direction of light propagation within the light guiding plate 16 in the case of the liquid crystal layer 12, whereas in the case of the liquid crystal layer 22 the direction is orthogonal to the direction of light propagation within the light guiding plate 16. The direction in which the liquid crystal molecules fall can be defined by rubbing a vertical alignment film, for example.

Paying attention to p-polarized light, the refractive index of the liquid crystal layer 22 with respect to the p-polarized light propagating within the light guiding plate 16 is approximately ne in the absence of an applied voltage (left-hand side in the FIGURE). Therefore, the p-polarized light is transmitted through the liquid crystal layer 22, without being totally reflected at the interface between the light guiding plate 16 and the liquid crystal layer 22 satisfying the relationship ns≈ne. The light which has been transmitted through the liquid crystal layer 22 is reflected by the oblique reflective layers 18a so as to be emitted toward the viewer's side.

On the other hand, under an applied voltage (right-hand side in the FIGURE), a voltage which is lower than those in the above-described conventional techniques is applied, Therefore, the orientation state of anchoring layers 22a does not change, but only the orientation state of an intermediate layer 22b changes. Hence, also under an applied voltage, the refractive index of the anchoring layers 22a with respect to p-polarized light is approximately ne, and the p-polarized light enters the liquid crystal layer 22 without being totally reflected at the interface between the light guiding plate 16 and the liquid crystal layer 22 satisfying the relationship ns≈ne. The refractive index with respect to the p-polarized light gradually decreases from the anchoring layers 22a toward the intermediate layer 22b, and approaches no. In or near the intermediate layer 22b where the refractive index changes, the p-polarized light is gradually refracted so as to be directed toward the front face side. This action of the liquid crystal layer 22 makes the p-polarized light appear as if totally reflected within the liquid crystal layer 22. The light which has been refracted within the liquid crystal layer 22 and directed toward the light guiding plate 16 propagates within the light guiding plate 16, and is not emitted toward the viewer's side.

Thus, similarly to in the liquid crystal display device 10, by using p-polarized light, the liquid crystal display device 20 is able to conduct white displaying in a voltage-OFF state or conduct black displaying in a voltage-ON state.

Figure 2:
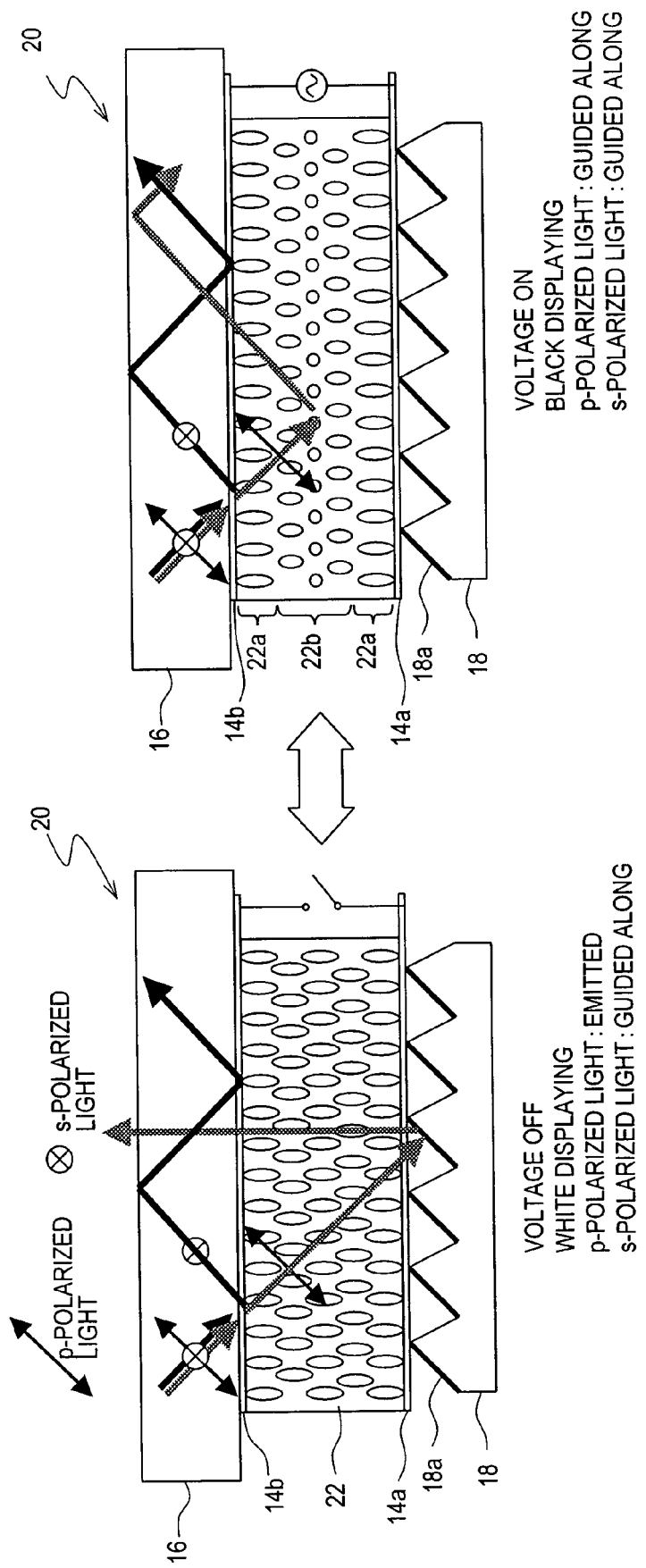
FIG. 2 A schematic diagram for explaining the construction and operation of a liquid crystal display device 20 according to another embodiment of the present invention.

Although the vertical-alignment type liquid crystal layers 12 and 22 illustrated in FIG. 1A and FIG. 2 are liquid crystal layers in which no chiral agent is contained, the viewing angle characteristics can be improved by adding a chiral agent to the liquid crystal layer.

Next, with reference to FIG. 3, the construction and operation of still another liquid crystal display device 30 according to an embodiment of the present invention will be described.

A liquid crystal layer 32 of the liquid crystal display device 30 is a horizontal-alignment type liquid crystal layer, and has positive dielectric anisotropy ($\Delta \in > 0$). Similarly to the aforementioned example, a refractive index ns of the light guiding plate 16 is prescribed to be approximately equal to the extraordinary refractive index ne ($=n_\| > no = n\bot$) of the liquid crystal molecules composing the liquid crystal layer 32 (ns≈ne).

Herein, s-polarized light will be paid attention to. The refractive index of the liquid crystal layer 32 with respect to the s-polarized light propagating within the light guiding plate 16 is approximately ne in the absence of an applied voltage (left-hand side in the FIGURE). Therefore, the s-polarized light is transmitted through the liquid crystal layer 32 without being totally reflected at the interface between the light guiding plate 16 and the liquid crystal layer 32 satisfying the relationship ns≈ne. The light which has been transmitted through the liquid crystal layer 32 is reflected by the oblique reflective layers 18a so as to be emitted toward the viewer's side.

On the other hand, under an applied voltage (right-hand side in the FIGURE), a voltage which is lower than those in the above-described conventional techniques is applied. Therefore, the orientation state of anchoring layers 32a does not change, but only the orientation state of an intermediate layer 32b changes. Hence, also under an applied voltage, the refractive index of the anchoring layers 32a with respect to s-polarized light is approximately ne, and the s-polarized light enters the liquid crystal layer 32 without being totally reflected by the interface between the light guiding plate 16 and the liquid crystal layer 32 satisfying the relationship ns≈ne. The refractive index with respect to s-polarized light gradually decreases from the anchoring layers 32a toward the intermediate layer 32b, and approaches no. In or near the intermediate layer 32b where the refractive index changes, the s-polarized light is gradually refracted so as to be directed toward the front face side. This action of the liquid crystal layer 32 makes the s-polarized light appear as if totally reflected within the liquid crystal layer 32. The light which has been refracted within the liquid crystal layer 32 and directed toward the light guiding plate 16 propagates within the light guiding plate 16, and is not emitted toward the viewer's side.

Thus, by using s-polarized light, the liquid crystal display device 30 having the horizontal-alignment type liquid crystal layer 32 is able to conduct white displaying in a voltage-OFF state or conduct black displaying in a voltage-ON state.

Note that, in the liquid crystal display device 30, p-polarized light is totally reflected at the interface between the light guiding plate 16 and the liquid crystal layer 32, irrespective of whether the voltage is ON or OFF. The reason is that the refractive index of the anchoring layers 32a of the liquid crystal layer 32 with respect to p-polarized light is no (≠ns), irrespective of whether the voltage is ON or OFF. Therefore, unlike in the above-described conventional techniques, it is unnecessary to separately provide any construction for eliminating the polarized light which is not used for displaying.

Figure 3:
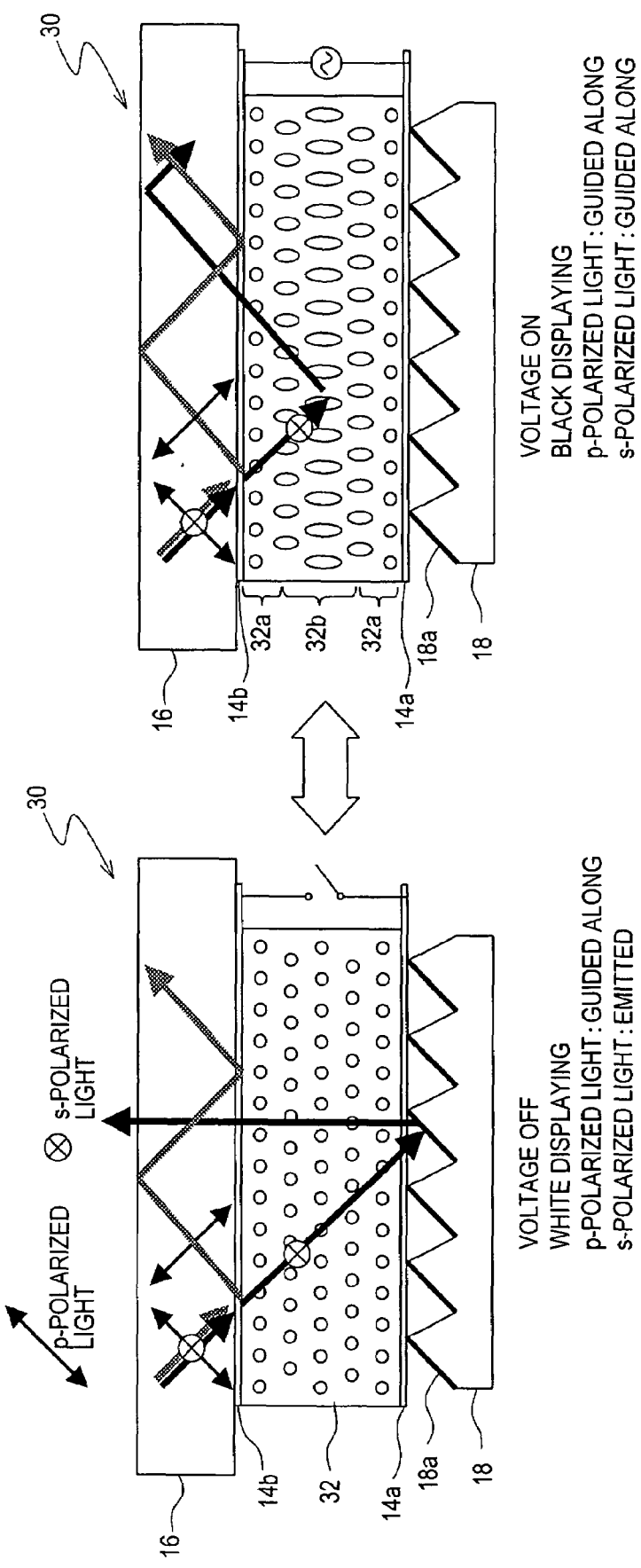
FIG. 3 A schematic diagram for explaining the construction and operation of a liquid crystal display device 30 according to still another embodiment of the present invention.
Figure 4:
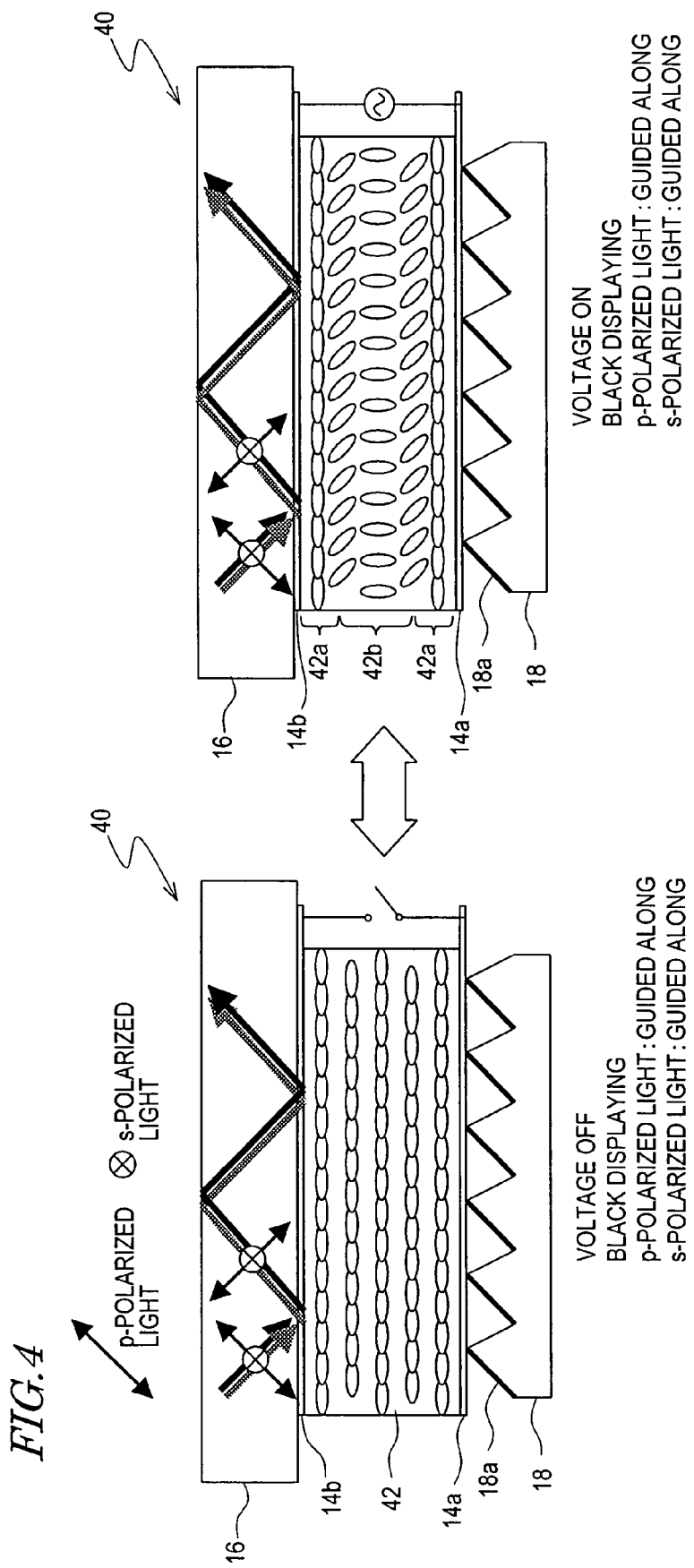
FIG. 4 A schematic diagram for explaining the construction and operation of a liquid crystal display device 40 as a comparative example.

However, in the case of using a horizontal-alignment type liquid crystal layer, the orientation directions (e.g., the direction of rubbing) of the liquid crystal molecules in the anchoring layers 32a need to be, as shown in FIG. 3, in a direction which is generally orthogonal to the direction of light propagation within the light guiding plate 16. If the orientation directions of the liquid crystal molecules in anchoring layers 42a were parallel to the direction of light propagation within the light guiding plate 16, as in a liquid crystal layer 42 of a liquid crystal display device 40 shown in FIG. 4, both s-polarized light and p-polarized light would always be totally reflected and it would be impossible to conduct displaying, because the orientation state of the anchoring layers 42a never changes even though the orientation state of an intermediate layer 42b might change due to the presence or absence of an applied voltage. Moreover, while a chiral agent may be added to the vertical-alignment type liquid crystal layer in the liquid crystal display device shown in FIG. 1A and FIG. 2, addition of a chiral agent is not preferable in the case of using a horizontal-alignment type liquid crystal layer. The reason is that, if the twist angle of the liquid crystal layer becomes too large, the s-polarized light having been transmitted through the anchoring layer will be refracted by the intermediate layer irrespective of whether the voltage is ON or OFF.

In the above description, electrodes (typically pixel electrodes and a counter electrode) which are provided above and under the liquid crystal layer (i.e., on the front face side and the rear face side) are illustrated as electrodes for applying a voltage across the liquid crystal layer. However, the construction of a liquid crystal display device according to an embodiment of the present invention is not limited thereto. Hereinafter, a more specific construction of a liquid crystal display device according to an embodiment of the present invention will be described.

Figure 5A:
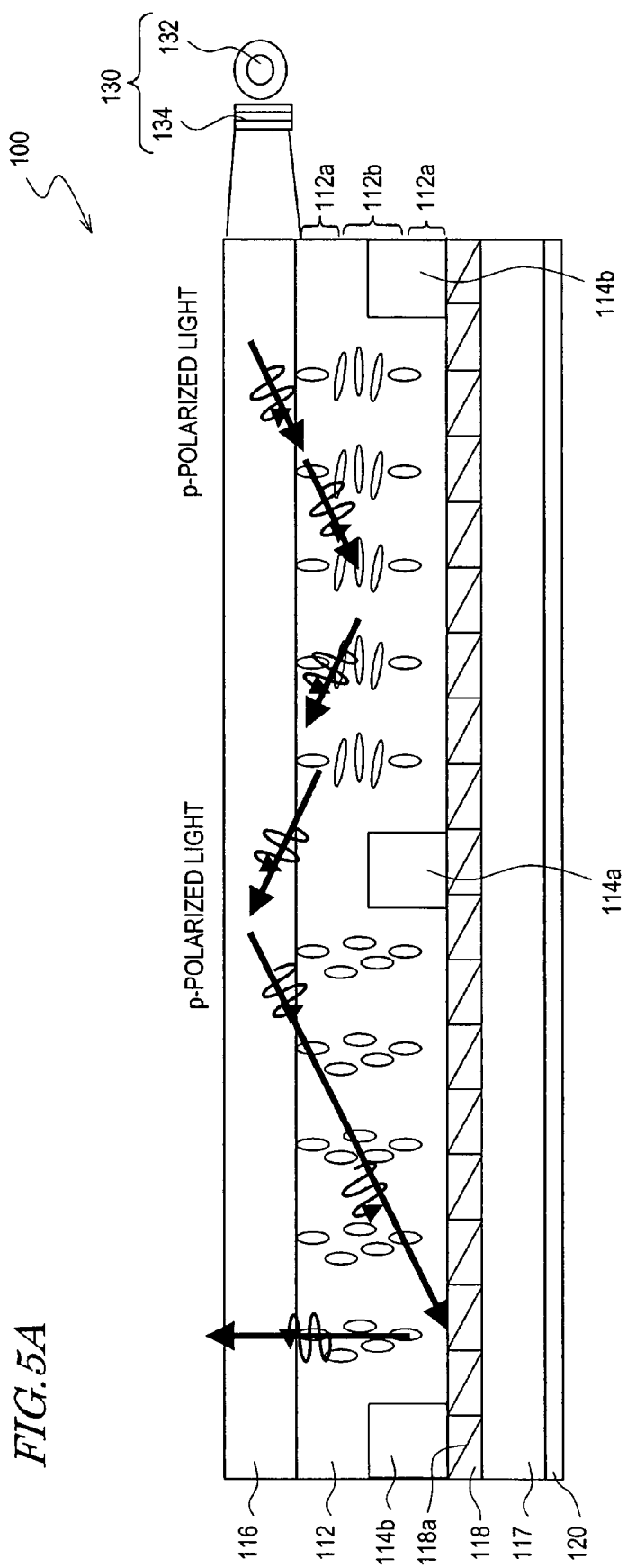
FIG. 5A A diagram for explaining the construction and operation of a liquid crystal display device 100 having a vertical-alignment type liquid crystal layer according to an embodiment of the present invention.
Figure 5B:
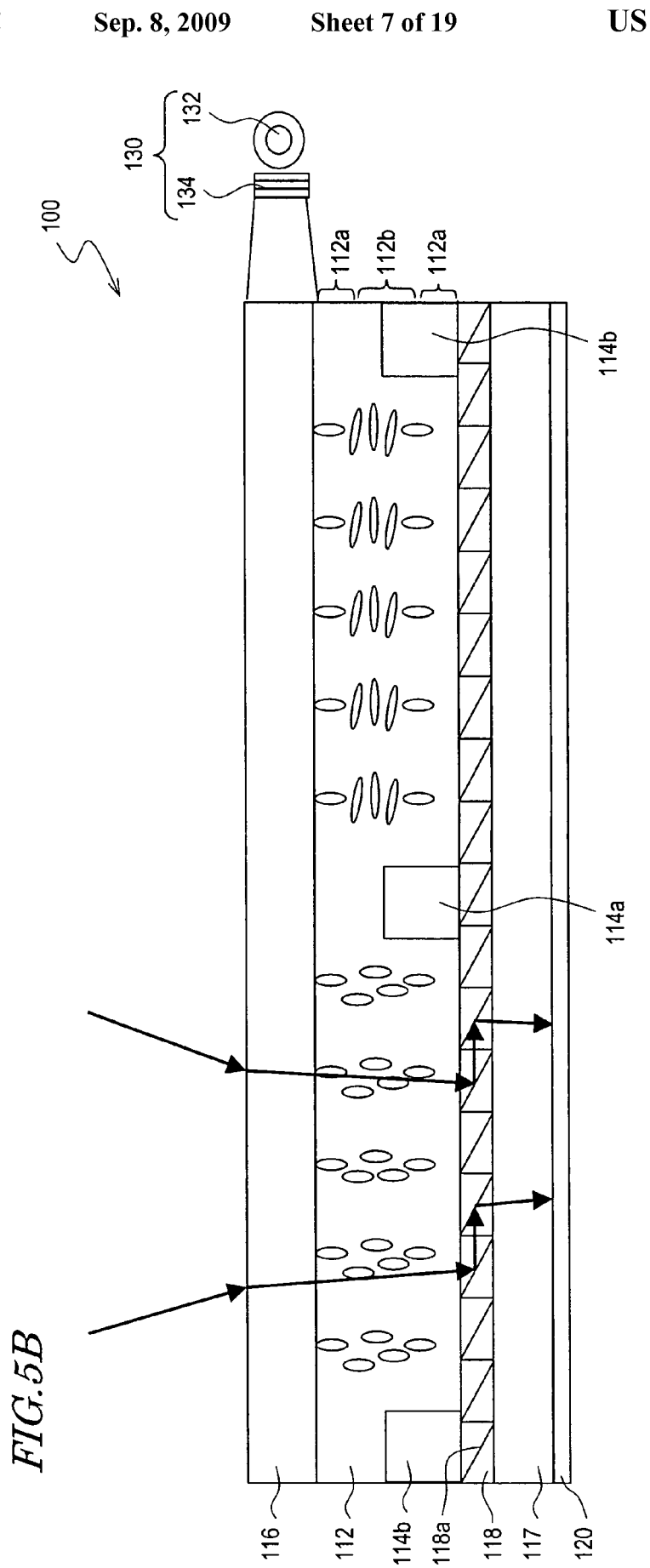
FIG. 5B Another diagram for explaining the construction and operation of the liquid crystal display device 100 having a vertical-alignment type liquid crystal layer according to an embodiment of the present invention.
Figure 6:
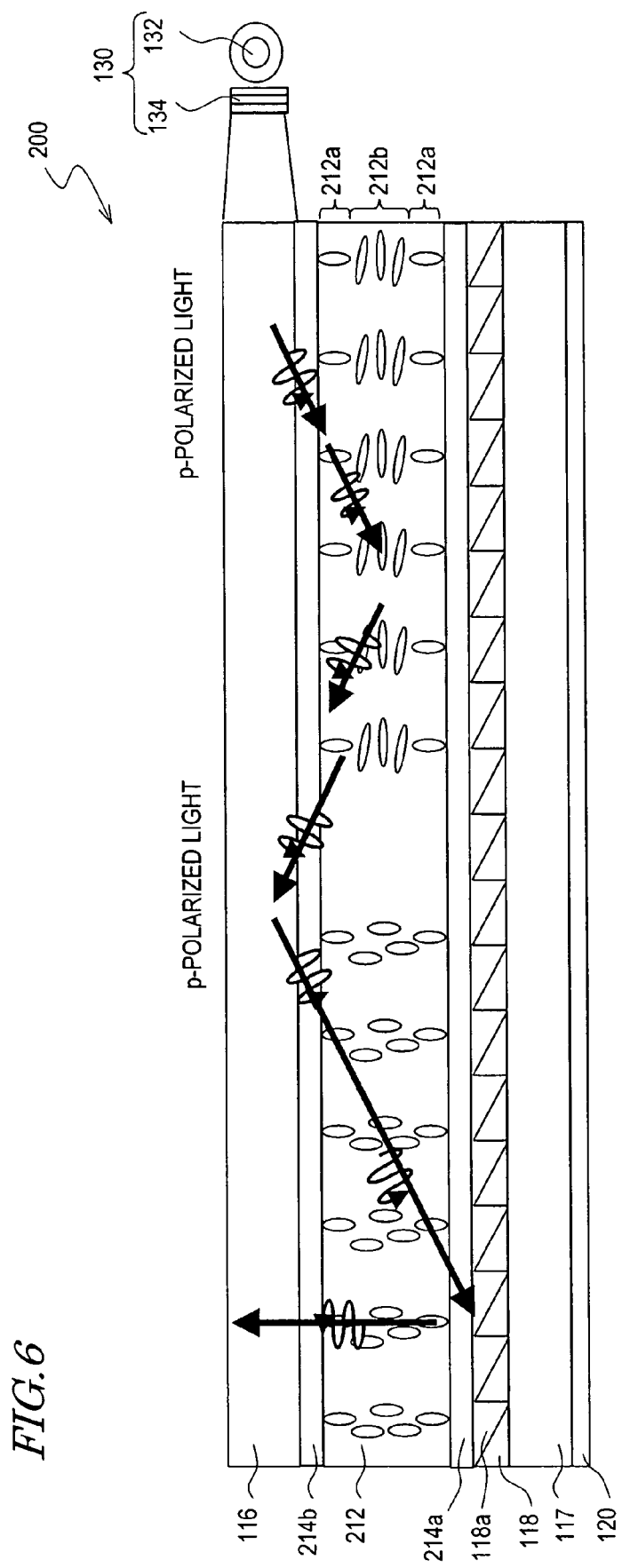
FIG. 6 A diagram for explaining the construction and operation of another liquid crystal display device 200 having a vertical-alignment type liquid crystal layer according to an embodiment of the present invention.

First, with reference to FIG. 5A, FIG. 5B, and FIG. 6, the construction and operation of a display device having a vertical-alignment type liquid crystal layer will be specifically described.

A liquid crystal display device 100 shown in FIG. 5A and FIG. 5B includes a vertical-alignment type liquid crystal layer 112 which is composed of liquid crystal molecules having positive dielectric anisotropy, and presents display by using p-polarized light. Although the dielectric anisotropy of the liquid crystal molecules and the direction of the electric field to be applied across the liquid crystal layer are different, the operation principles of the liquid crystal display device 100 are similar to those of the liquid crystal display device 10 shown in FIG. 1A.

The liquid crystal display device 100 includes a liquid crystal layer 112, a plurality of electrodes 114a and 114b for applying a voltage across the liquid crystal layer 112, and an illuminator 130 for emitting light toward one of the principal faces of the liquid crystal layer 112. The electrodes 114a and 114b are disposed in the liquid crystal layer plane, and the liquid crystal display device 100 is a liquid crystal display device of a so-called lateral electric field mode.

The liquid crystal layer 112 of the liquid crystal display device 100 is provided between a front substrate 116 and a rear substrate 117, such that the front substrate 116 serves also as a light guiding plate for the illuminator 130. Moreover, a reflector 118 is provided on the side of the rear substrate 117 facing the liquid crystal layer 112. The reflector 118 includes oblique reflective layers 118a which are slanted with respect to the display surface (liquid crystal layer plane), and reflects light which has been transmitted through the liquid crystal layer 112 toward the front face side (FIG. 5A). Furthermore, a light absorbing layer 120 is provided on the rear face side of the rear substrate 117, such that the light absorbing layer 120 absorbs unwanted light which has been transmitted through the side faces supporting the oblique reflective layers 118a of the reflector 118 (FIG. 5B). The light to be absorbed by the light absorbing layer 120 is ambient light, and the provision of the light absorbing layer 120 enables direct-viewing type displaying. Even if this is omitted, it can still be used as a liquid crystal display panel for a projection type display device, for example.

The illuminator 130 includes a white light source 132, a polarization-selective film 134, and a front substrate 116 functioning as a light guiding plate. Light (containing s-polarized light and p-polarized light) which is emitted from the white light source 132 enters the polarization-selective film 134, so that only the p-polarized light is emitted toward the front substrate 116. As such a polarization-selective film 134, DBEF manufactured by 3M can be used, for example. By disposing a DBEF so that its transmission direction extends lengthwise (i.e., parallel to the plane of the FIGURE), it is ensured that only the p-polarized light is introduced into the front substrate 116. As has been described with reference to FIG. 1A and the like, the polarization-selective film may be omitted and it is still possible to allow only the p-polarized light to be emitted from the front substrate 116 toward the liquid crystal layer 112, but using the polarization-selective film 134 will make for an improved efficiency of light utilization. Furthermore, by providing a reflective layer (not shown) on the side face that is opposite from the side face of the front substrate 116 at which the light source 132 is disposed, the efficiency of light utilization can be further improved. In this case, it is preferable to provide a ¼ wavelength plate (not shown) between the side face of the front substrate 116 and the reflective layer. As the front substrate 116 functioning also as a light guiding plate, a glass substrate having a refractive index (ns) of 1.62 is used, for example. Note that a similar glass substrate can also be used for the rear substrate 117, without any limitation as to its refractive indices. The front substrate 116 and the rear substrate 117 are not limited to glass substrates, but may be any substrates that are transparent and composed of an optically isotropic material, and polymer films may also be used.

As the liquid crystal material composing the liquid crystal layer 112, a nematic liquid crystal material which has positive refractive index anisotropy (ne=1.6170, no=1.4896) and positive dielectric anisotropy ($\Delta\epsilon>0$) is used. By providing known vertical alignment films (not shown) on both sides of the liquid crystal layer 112, the liquid crystal molecules can be vertically aligned.

As for the electrodes 114a and 114b for applying a voltage across the liquid crystal layer 112, a construction similar to that of a known IPS mode liquid crystal display device can be adopted, for example. Via a switching element (not shown) such as a TFT, a predetermined voltage is supplied to the electrode(s) 114a and/or 114b. The electrodes 114a and 114b are disposed so as to oppose each other along the direction of light propagation within the front substrate 116. In other words, the electrodes 114a and 114b are disposed so that the direction of the electric field generated therebetween is parallel to the direction of light propagation. As a result, the direction in which the liquid crystal molecules fall (tilt) when a voltage is applied across the liquid crystal layer 112 is essentially parallel to the direction of light propagation within the front substrate 116.

By thus adopting the lateral electric field mode, it becomes unnecessary to provide a transparent electrode (typically an ITO layer) between the front substrate 116 and the liquid crystal layer 112, thus resulting in an advantage of losslessness in terms of light transmittance at the interface with the transparent electrodes.

As the reflector 118, a known oblique reflector can be used. For example, it can be obtained by, using e.g. Al or an Al alloy, forming the oblique reflective layers 118a on slopes of a resist layer which has been processed into a predetermined shape. The angle of tilt (the angle with respect to the substrate plane; the angle from the horizontal direction in the FIGURE) of each oblique reflective layer 118a is preferably in the range of no less than 26° and no more than 53°, and may be set to 39°, for example.

The light absorbing layer 120 which is provided on the rear face of the rear substrate 117 is a black resin layer, for example.

With reference to the left-hand side of FIG. 5A, the operation in the absence of an applied voltage will be described.

The refractive index of the liquid crystal layer 112 with respect to the p-polarized light which is guided through the front substrate 116 is approximately ne in the absence of an applied voltage. Therefore, the p-polarized light is transmitted through the liquid crystal layer 112 without being totally reflected at the interface between the front substrate 116 and the liquid crystal layer 112 satisfying the relationship ns≈ne. The light which has been transmitted through the liquid crystal layer 112 is reflected by the oblique reflective layers 118a so as to be emitted toward the viewer's side.

With reference to the right-hand side of FIG. 5A, the operation under an applied voltage will be described.

Under an applied voltage (right-hand side in the FIGURE), the orientation state of anchoring layers 112a does not change, but only the orientation state of an intermediate layer 112b changes. Hence, also under an applied voltage, the refractive index of the anchoring layers 112a with respect to p-polarized light is approximately ne, and the p-polarized light enters the liquid crystal layer 112 without being totally reflected at the interface between the front substrate 116 and the liquid crystal layer 112 satisfying the relationship ns≈ne. The refractive index with respect to p-polarized light gradually decreases from the anchoring layers 112a toward the intermediate layer 112b, and approaches no. In or near the intermediate layer 112b where the refractive index changes, the p-polarized light is gradually refracted so as to be directed toward the front face side. This action of the liquid crystal layer 112 makes the p-polarized light appear as if totally reflected within the liquid crystal layer 112. The light which has been refracted within the liquid crystal layer 112 and directed toward the front substrate 116 propagates within the front substrate 116, and is not emitted toward the viewer's side.

Thus, the liquid crystal display device 100 displays white while no voltage is applied across the liquid crystal layer 112, or conducts black displaying while a voltage is applied across the liquid crystal layer 112.

A liquid crystal display device 200 shown in FIG. 6 differs from the liquid crystal display device 100 shown in FIG. 5A in that a vertical-alignment type liquid crystal layer 212 is composed of liquid crystal molecules having negative dielectric anisotropy, and electrodes 214a and 214b for applying a voltage across the liquid crystal layer 212 are disposed on the rear face side and the front face side of the liquid crystal layer 212. In the following FIGURES, constituent elements having the same functions as those of the constituent elements of the liquid crystal display device 100 will be denoted by the same reference numerals, and the descriptions thereof will be omitted.

The liquid crystal display device 200 also presents display by using p-polarized light, based on operation principles similar to those of the liquid crystal display device 100. The anchoring layers 212a do not change their orientation state in response to a voltage application, but transmit p-polarized light. Voltage application only causes the orientation state of the intermediate layer 212b to change so that the p-polarized light is refracted toward the front substrate 116 side. Thus, white is displayed in the absence of an applied voltage, and black is displayed under an applied voltage.

As for the construction of the electrodes 214a and 214b, a construction similar to that of a known TFT type liquid crystal display device can be adopted, for example. For example, the electrodes 214a are pixel electrodes which are placed in a matrix arrangement, and the electrode 214b is a counter electrode (common electrode). Typically, both are formed of transparent conductive films such as ITO. By adopting this construction, although there is a loss of light due to the electrodes 214a provided between the front substrate 116 and the liquid crystal layer 212, there is no decrease in pixel aperture ratio to be caused by any electrode formed within the pixel from a material of a light-shielding nature, as in the case of the lateral electric field mode.

Figure 7:
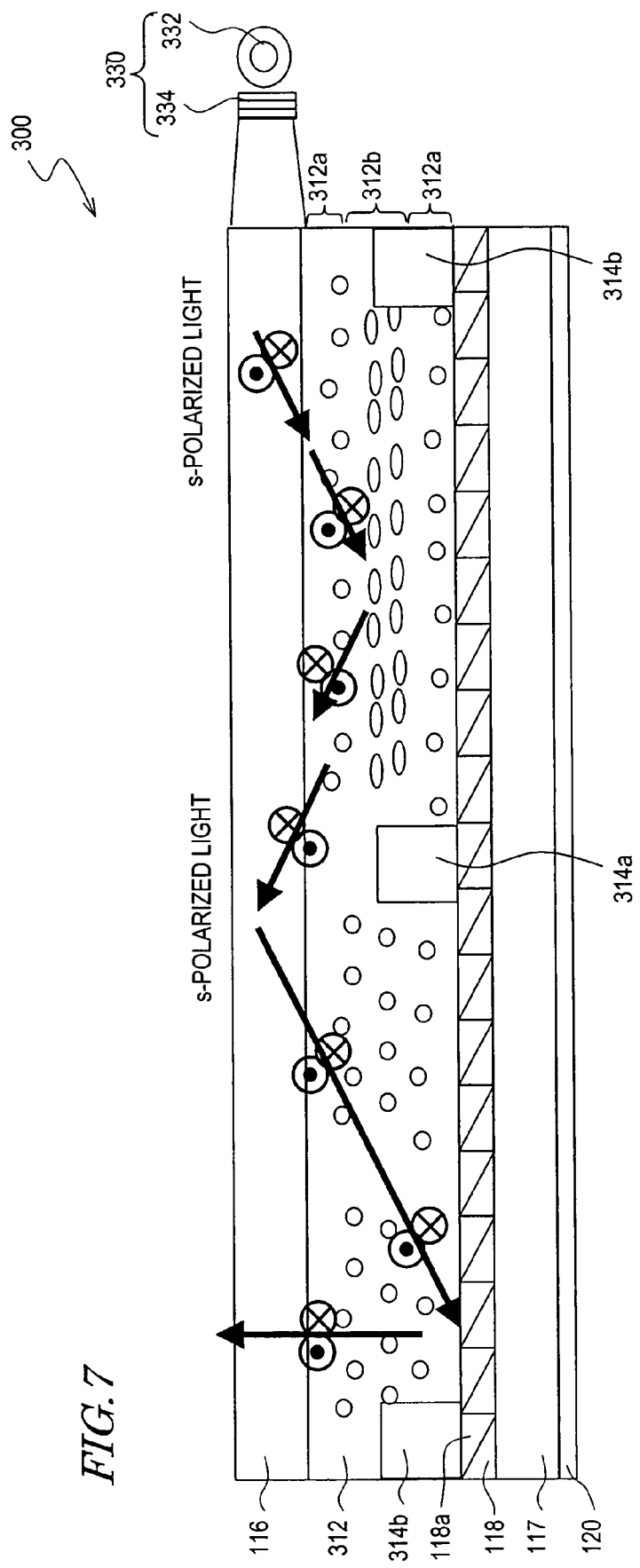
FIG. 7 A diagram for explaining the construction and operation of a liquid crystal display device 300 having a horizontal-alignment type liquid crystal layer according to an embodiment of the present invention.
Figure 8:
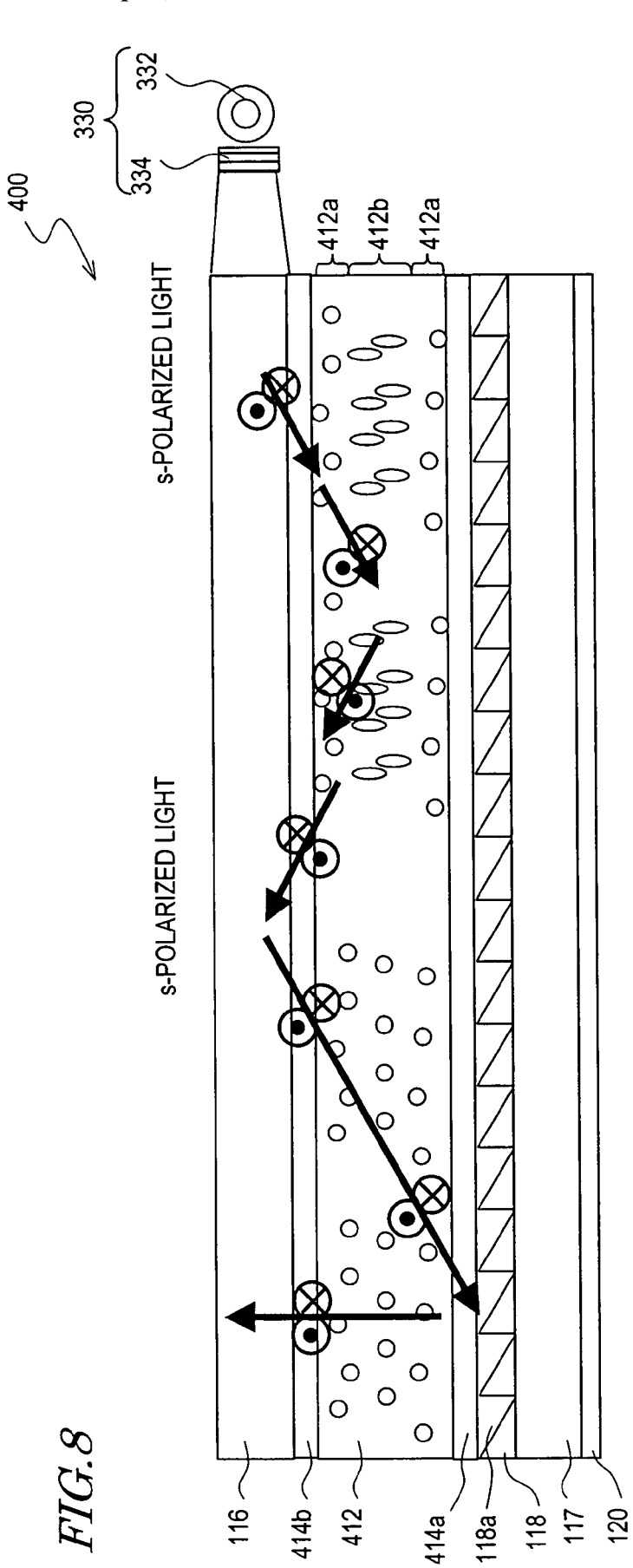
FIG. 8 A diagram for explaining the construction and operation of another liquid crystal display device 400 having a horizontal-alignment type liquid crystal layer according to an embodiment of the present invention.

Next, with reference to FIG. 7 and FIG. 8, the construction and operation of a display device having a horizontal-alignment type liquid crystal layer will be specifically described.

A liquid crystal display device 300 shown in FIG. 7 differs from the liquid crystal display device 100 shown in FIG. 5A in that it comprises a horizontal-alignment type liquid crystal layer 312 composed of liquid crystal molecules having positive dielectric anisotropy, and that an illuminator 330 is constructed so as to emit s-polarized light toward the liquid crystal layer 312. The liquid crystal display device 300 presents display by using s-polarized light, based on operation principles similar to those of the liquid crystal display device 30 shown in FIG. 3. However, as described below, the liquid crystal display device 300 operates in the lateral electric field mode.

The illuminator 330 includes a white light source 332, a polarization-selective film 334, and a front substrate 116 functioning as a light guiding plate. Light (containing s-polarized light and p-polarized light) which is emitted from the white light source 332 enters the polarization-selective film 334, so that only the s-polarized light is emitted toward the front substrate 116. As such a polarization-selective film 334, DBEF manufactured by 3M can be used. By disposing a DBEF so that its transmission direction extends laterally (i.e., perpendicularly to the plane of the FIGURE), it is ensured that only the s-polarized light is introduced into the front substrate 116. The refractive index ns of the front substrate 116 is prescribed to be approximately equal to the extraordinary refractive index ne (=n∥>no=n⊥) of the liquid crystal molecules composing the liquid crystal layer 312 (ns≈ne).

The refractive index of the liquid crystal layer 312 with respect to the s-polarized light propagating within the front substrate 116 is approximately ne in the absence of an applied voltage (left-hand side in the FIGURE). Therefore, the s-polarized light is transmitted through the liquid crystal layer 312 without being totally reflected at the interface between the front substrate 116 and the liquid crystal layer 312 satisfying the relationship ns≈ne. The light which has been transmitted through the liquid crystal layer 312 is reflected by the oblique reflective layers 118a so as to be emitted toward the viewer's side.

On the other hand, under an applied voltage (right-hand side in the FIGURE), the orientation state of an anchoring layers 312a does not change, but only the orientation state of an intermediate layer 312b changes. Hence, also under an applied voltage, the refractive index of the anchoring layers 312a with respect to s-polarized light is approximately ne, and the s-polarized light enters the liquid crystal layer 312 without being totally reflected at the interface between the front substrate 116 and the liquid crystal layer 312 satisfying the relationship ns≈ne. The refractive index with respect to s-polarized light gradually decreases from the anchoring layers 312a toward the intermediate layer 312b, and approaches no. In or near the intermediate layer 312b where the refractive index changes, the s-polarized light is gradually refracted so as to be directed toward the front face side. This action of the liquid crystal layer 312 makes the s-polarized light appear as if totally reflected within the liquid crystal layer 312. The light which has been refracted within the liquid crystal layer 312 and directed toward the front substrate 116 propagates within the front substrate 116, and is not emitted toward the viewer's side.

Thus, the liquid crystal display device 300 having the horizontal-alignment type liquid crystal layer 312 is able to conduct white displaying in a voltage-OFF state or conduct black displaying in a voltage-ON state, by using s-polarized light. Adopting the lateral electric field mode makes it unnecessary to provide a transparent electrode (typically an ITO layer) between the front substrate 116 and the liquid crystal layer 312, thus resulting in an advantage of losslessness in terms of light transmittance at the interface with the transparent electrodes.

Note that, in the liquid crystal display device shown in FIG. 7, the liquid crystal molecules composing the horizontal-alignment type liquid crystal layer 312 may have a negative dielectric anisotropy, and the electrodes 314a and 314b for applying a voltage across the liquid crystal layer 312 may be disposed along a direction which is orthogonal to the direction of light propagation within the front substrate 116 (i.e., the direction perpendicular to the plane of FIG. 7), and the orientation illustrated in FIG. 7 can still be obtained.

A liquid crystal display device 400 shown in FIG. 8 differs from the liquid crystal display device 300 shown in FIG. 7 in that electrodes 414a and 414b for applying a voltage across a liquid crystal layer 412 are disposed on the rear face side and the front face side of the liquid crystal layer 412. The liquid crystal layer 412 is composed of liquid crystal molecules having positive dielectric anisotropy.

The liquid crystal display device 400 presents display by using s-polarized light, based on operation principles similar to those of the liquid crystal display device 30 shown in FIG. 3. The anchoring layers 412a do not change their orientation state in response to a voltage application, but transmit s-polarized light. Voltage application only causes the orientation state of the intermediate layer 412b to change so that the s-polarized light is refracted toward the front substrate 116 side. Thus, white is displayed in the absence of an applied voltage, and black is displayed under an applied voltage.

The display device according to the present invention is not limited to the above-described reflection type liquid crystal display devices, but can also be a fluorescent display device which utilizes fluorescence for displaying.

Figure 9:
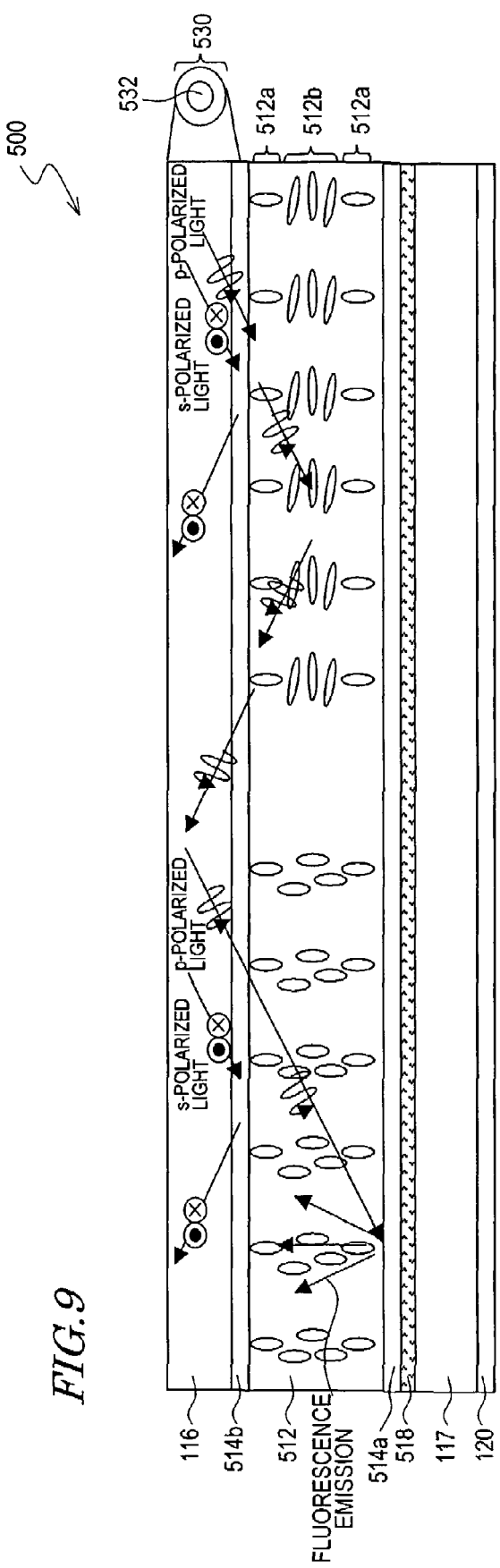
FIG. 9 A diagram for explaining the construction and operation of a fluorescent display device 500 according to an embodiment of the present invention.

For example, a fluorescent display device 500 shown in FIG. 9 switches between a state where p-polarized light is transmitted through the liquid crystal layer 512 or a state where it is not transmitted, based on the same operation principles as those of the liquid crystal display device 200 described with reference to FIG. 6.

The fluorescent display device 500 includes a liquid crystal layer 512, a plurality of electrodes 514a and 514 for applying a voltage across the liquid crystal layer 512, and an illuminator 530 for emitting light toward one of the principal faces of the liquid crystal layer 512.

The liquid crystal layer 512 is provided between a front substrate 116 and a rear substrate 117, such that the front substrate 116 serves also as a light guiding plate for the illuminator 530. Moreover, a fluorophore layer 518 is provided on the side of the rear substrate 117 facing the liquid crystal layer 512. Furthermore, a light absorbing layer 120 is provided on the rear face side of the rear substrate 117, such that the light absorbing layer 120 absorbs ambient light. By providing the light absorbing layer 120, it becomes possible to conduct good dark displaying.

A light source 532 in the illuminator 530 emits light for exciting a fluorophore in the fluorophore layer 518. The excitation light is typically near-ultraviolet to ultraviolet (wavelength 350 nm to 420 nm) light. In the case where cadmium telluride is used as the fluorophore layer 518, the wavelength of the excitation light is 405 nm. As necessary, a wavelength selection filter may be provided between the light source 532 and the incident side face of the front substrate 116. The fluorophore layer 518 can be formed by a known method.

The excitation light (containing p-polarized light and s-polarized light) which is emitted from the light source 532 propagates within the front substrate 116. Herein, the refractive index ns of the front substrate 116 is prescribed to be approximately equal to the extraordinary refractive index ne (=n∥) of the liquid crystal molecules composing the liquid crystal layer 512 (ns≈ne). The liquid crystal molecules composing the liquid crystal layer 512 has negative dielectric anisotropy (Δε<0) and positive refractive index anisotropy (ne>no).

As has been described with reference to FIG. 1A, the refractive index of the liquid crystal layer 512 with respect to the p-polarized light propagating within the front substrate 116 is approximately ne in the absence of an applied voltage (left-hand side in the FIGURE). Therefore, the p-polarized light is transmitted through the liquid crystal layer 512 without being totally reflected at the interface between the front substrate 116 and the liquid crystal layer 512 satisfying the relationship ns≈ne. The light which has been transmitted through the liquid crystal layer 512 enters the fluorophore layer 518, and excites the fluorophore. The fluorophore layer 518 undergoes fluorescence emission, and this fluorescence is transmitted through the liquid crystal layer 512 so as to be emitted toward the viewer's side, thus conducting bright displaying. The displayed color at this time depends on the wavelength of the fluorescence. By appropriately selecting the fluorophore, it becomes possible to display a predetermined color. Moreover, a construction for emitting white light may be combined with a color filter. However, use of color filters will reduce the efficiency of light utilization, it is preferable to perform color displaying by using fluorophores which emit light of predetermined colors. The emission colors of fluorophores may be red, green, and blue, for example, but are not limited thereto. Color display may be presented by using three or more types of color light by using three or more types of fluorophores. Moreover, since the fluorescence emission which is used by the fluorescent display device 500 for displaying is isotropic, it is possible to obtain displaying without viewing angle dependence.

On the other hand, under an applied voltage (right-hand side in the FIGURE), the orientation state of anchoring layers 512a does not change, but only the orientation state of an intermediate layer 512b changes. Therefore, also under an applied voltage, the refractive index of the anchoring layer 512a with respect to p-polarized light is approximately ne, and p-polarized light enters the liquid crystal layer 512 without being totally reflected at the interface between the front substrate 116 and the liquid crystal layer 512 at the interface between the front substrate 116 and the liquid crystal layer 512 satisfying the relationship ns≈ne. The refractive index with respect to p-polarized light gradually decreases from the anchoring layer 512a toward the intermediate layer 512b, and approaches no. In or near the intermediate layer 512b where the refractive index changes, the p-polarized light is gradually refracted, so as to be directed toward the front face side. The light which has been refracted within the liquid crystal layer 512 and directed toward the front substrate 116 propagates within the front substrate 116, and is not emitted toward the viewer's side.

Moreover, the light which enters from the surroundings passes through the liquid crystal layer 512 and the fluorophore layer 518, and is absorbed by the light absorbing layer 120. Provision of the light absorbing layer 120 makes for an improved display quality.

Thus, by using p-polarized light, the liquid crystal display device 500 is able to conduct white displaying (bright displaying) in a voltage-OFF state, or conduct black displaying (dark displaying) in a voltage-ON state.

Note that, in the liquid crystal display device 500, s-polarized light is totally reflected at the interface between the front substrate 116 and the liquid crystal layer 512, irrespective of whether the voltage is ON or OFF, and does not enter the liquid crystal layer 512. When a vertical-alignment type liquid crystal layer is employed, s-polarized light never enters the liquid crystal layer 512, irrespective of which one of the four side faces of the front substrate 116 a light source is located at. Therefore, by providing light sources at a plurality of side faces, luminance can be improved.

Figure 10:
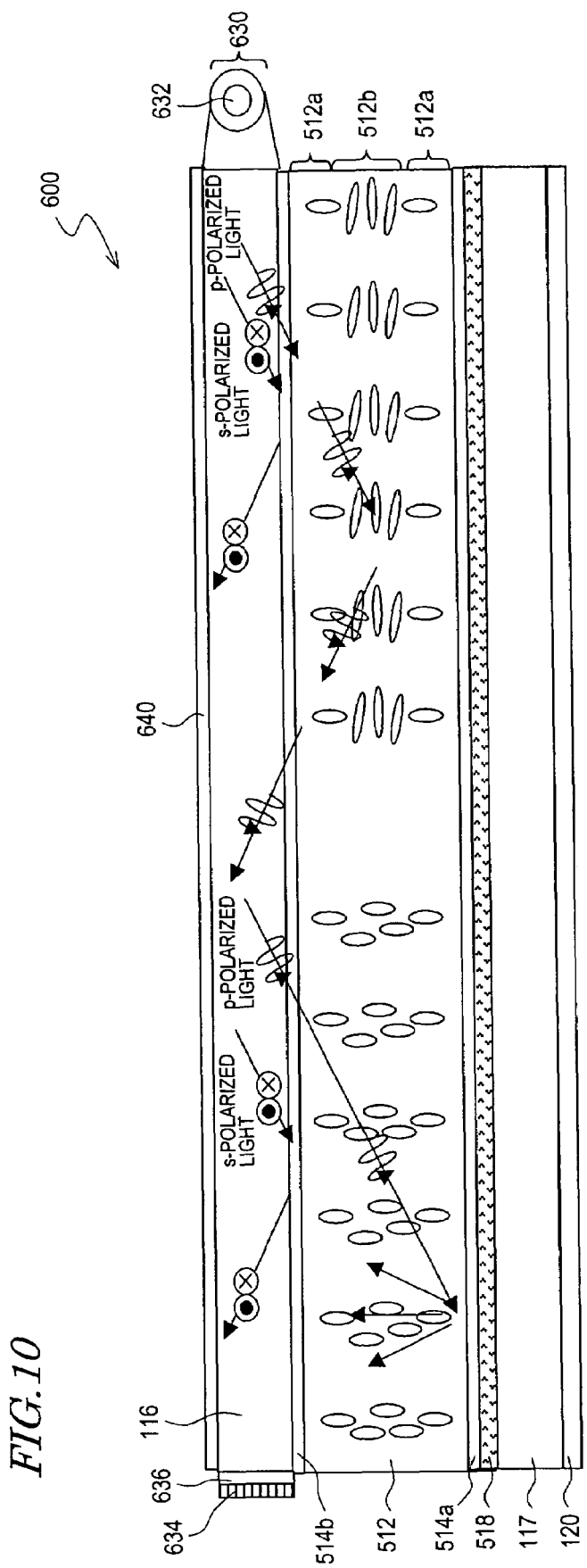
FIG. 10 A diagram for explaining the construction and operation of another fluorescent display device 600 according to an embodiment of the present invention.

Next, with reference to FIG. 10, the construction and operation of another fluorescent display device 600 according to an embodiment of the present invention will be described. In the following FIGURES, constituent elements having the same functions as those of the constituent elements of the fluorescent display device 500 shown in FIG. 9 will be denoted by the same reference numerals, and the descriptions thereof will be omitted. The left-hand side of FIG. 10 shows a state in the absence of an applied voltage, and the right-hand side shows a state under an applied voltage.

An illuminator 630 of the fluorescent display device 600 includes: a light source 632 for emitting light for exciting a fluorophore layer 518; a front substrate 116 functioning also as a light guide; a reflective layer 634 which is provided on a side face that is opposite from the side face of the front substrate 116 at which the light source 632 is disposed; and a ¼ wavelength plate 636 which is provided between the side face of the front substrate 116 and the reflective layer 634.

The s-polarized light which is emitted from the light source 632 and propagates within the front substrate 116 is transmitted through the ¼ wavelength plate 636, then reflected by the reflective layer 634, and again transmitted through the ¼ wavelength plate 636 so as to be converted into p-polarized light. Thus, it is possible to utilize the s-polarized light, which is not utilized in the aforementioned fluorescent display device 500. Instead of providing the reflective layer 634 and the ¼ wavelength plate 636, the aforementioned polarization-selective film (e.g., DBEF) may be provided between the light source 632 and the incident end face of the front substrate 116. It will be appreciated that, conversely, a reflective layer and a ¼ wavelength plate may be provided in the above-described liquid crystal display devices, instead of providing a polarization-selective film.

The fluorescent display device 600 further includes an excitation light cut filter 640 on the viewer's side of the front substrate 116. The excitation light cut filter 640 absorbs the excitation light which is contained in the ambient light, thus preventing the fluorophore layer 518 from being excited by ambient light and emitting light. Preferably, the excitation light cut filter absorbs not only the excitation light of the wavelength emitted from the light source 632, but light in the entire wavelength range contained in the ambient light (sunlight or indoor illumination) that is capable of exciting the fluorophore layer 518. Typically, a filter which absorbs light in the near-ultraviolet to ultraviolet region (wavelength 350 nm to 420 nm) is preferable, although it may be appropriately selected in accordance with the type of the fluorophore contained in the fluorophore layer 518. By providing the excitation light cut filter 640, it becomes possible to suppress fluorescence emission by ambient light whose transmission/non-transmission is not controlled by the liquid crystal layer 512, whereby the quality of dark displaying and the contrast ratio can be improved.

Note that, when using an illuminator such as the illuminator 630, constructed so that the light source 632 is disposed on one of the two opposing side faces of the front substrate 116 and the reflective layer 634 is disposed on the other, there is a large light amount at the end closer to the light source 632, but the light amount decreases in the direction of light propagation, such that there is a smaller light amount near the center of the front substrate 116. Thus, the amount of excitation light that is supplied by the illuminator construction (light guiding plate construction) has a distribution, which may cause unevenness in luminance such that the display surface is brighter at the ends and darker at the central portion, for example. In order to prevent this, it is preferable to vary the aperture ratio (the area through which excitation light enters the fluorophore layer) of each pixel of the display device in accordance with the amount of excitation light that is supplied. For example, by increasing the pixel aperture ratio near the center of the display screen and decreasing the pixel aperture ratio near both ends, unevenness in luminance can be reduced.

Next, with reference to FIG. 11, the construction and operation of still another fluorescent display device 700 according to an embodiment of the present invention will be described. The left-hand side of FIG. 11 shows a state in the absence of an applied voltage, and the right-hand side shows a state under an applied voltage.

The fluorescent display device 700 includes a reflective layer 717 between a rear substrate 117 and a fluorophore layer 718. Out of the fluorescence that is emitted from the fluorophore layer 718, the light which is emitted toward the rear face side is redirected by the reflective layer 717 toward the front face side, whereby the efficiency of fluorescence utilization can be improved.

Figure 11:
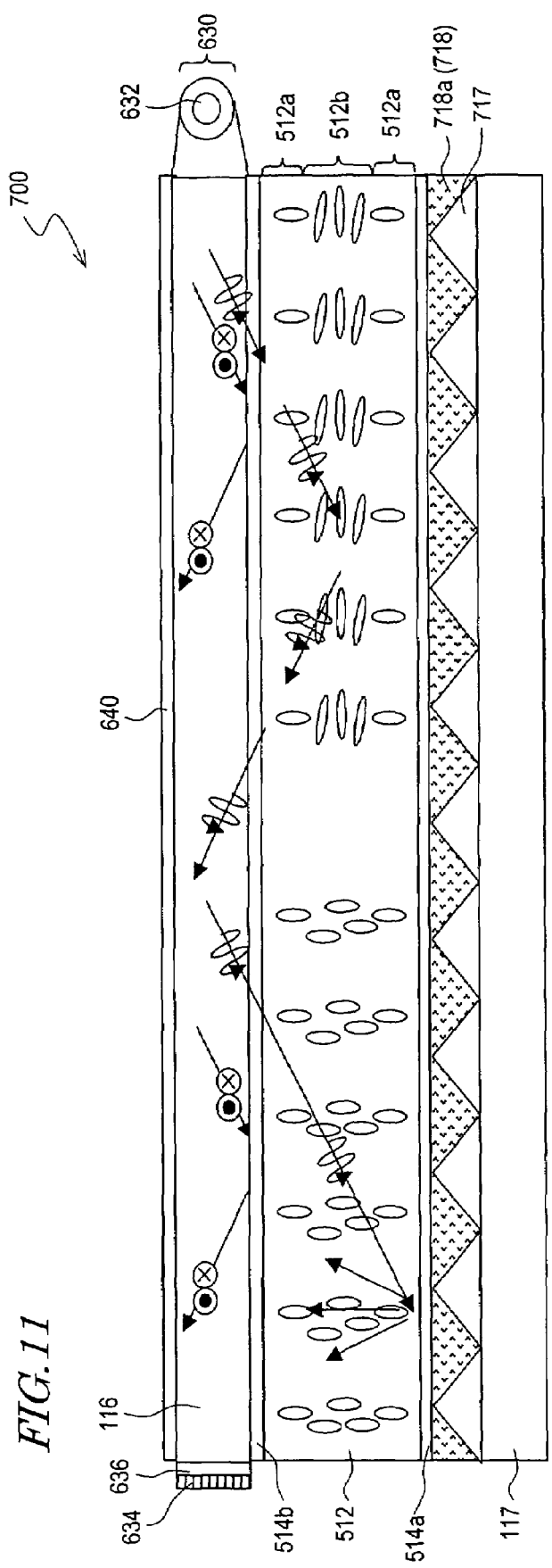
FIG. 11 A diagram for explaining the construction and operation of still another fluorescent display device 700 according to an embodiment of the present invention.
Figure 12:
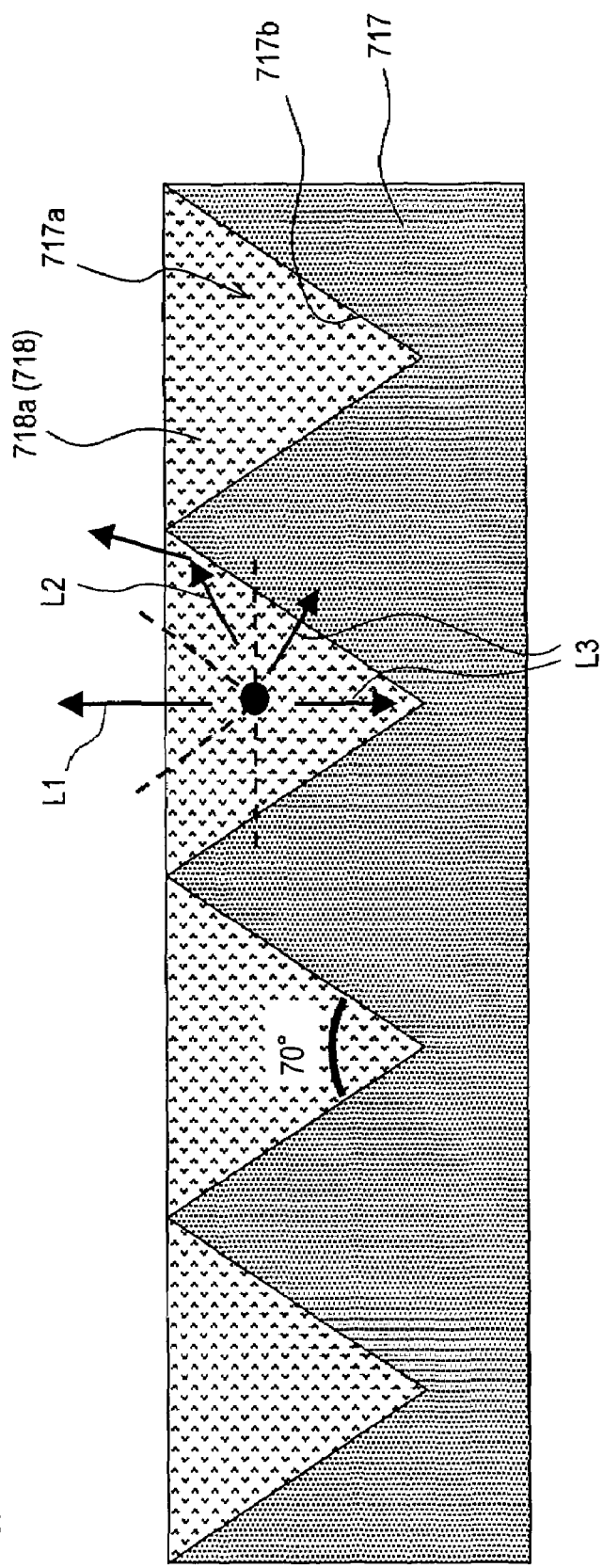
FIG. 12 A schematic cross-sectional view showing the construction of a reflective layer 717 which is used for the fluorescent display device 700.

A preferable reflective layer 717 includes a plurality of recesses 717a, as shown in FIG. 11 and FIG. 12, such that inner slopes 717b of the recesses 717a have reflection characteristics. The entire reflective layer 717 may be formed of a material having reflection characteristics, or a film having reflection characteristics may be formed only on the slopes 717b of the recesses 717a. When adopting a construction in which the slopes 717b of the recesses 717a have reflection characteristics, the light which enters from the surroundings of the display device 700 is subjected to multiple reflection at the slopes 717b, thus becoming unlikely to be emitted toward the viewer's side. This also provides an effect of improving the dark displaying quality.

With reference to FIG. 12, for example, a construction will be discussed which includes: a reflective layer 717 that includes, on the slopes 717b of each recess 717a which is a rectangular pyramid with a vertex angle of 70°, a reflective film composed of a metal having a reflectance of about 30%; and a fluorophore layer 718 composed of a plurality of fluorophore portions 718a which are formed by filling the recesses 717a of the reflective layer 717 with a fluorescent material. The fluorescent material is obtained by dispersing a powder of fluorophore into a resin having a refractive index of 1.7, for example, and planarizes the surface of the fluorophore layer 718.

Light which externally enters the display device is reflected four or more times by the slopes 717b on which a reflective film is formed, and thereafter emitted externally from the display device. Since the reflective film has a reflectance of about 30%, the apparent reflectance of the reflective layer 717 will be a fourth power of that value, i.e., 0.8%. Therefore, the light which externally enters the display device is absorbed essentially inside the display device, and is not emitted externally.

Next, the emission efficiency of the light which is emitted by the fluorophore will be discussed.

Now, the fluorescence which is emitted from the center of each recess 717a will be classified based on an outgoing direction as expressed by its angle (which is an absolute value here) with respect to the display surface normal direction (substrate normal direction of the rear substrate 117). Light (L1) having an emission angle from 0° to 36° is directly emitted from the fluorophore layer 718, without being reflected by the reflective film. Light (L2) having an emission angle from 36° to 90° is reflected once by a slope 717b before being emitted from the fluorophore layer 718. Light (L3) having an emission angle from 90° to 180° is reflected by the slopes 717b two or more times, and only a small fraction thereof is emitted from the portion fluorophore layer 718. Therefore, the light which is emitted from the fluorophore layer 718 is mainly light (L1) having an emission angle from 0° to 36° and light (L2) having an emission angle from 36° to 90°, accounting for 30%.

Furthermore, by employing a corner cube array as the reflective layer, it becomes possible to improve the luminance in bright displaying while maintaining good dark displaying. A corner cube array is a regular array of corner cubes each having a shape corresponding to a corner of a cube and having three faces that are orthogonal to one another. A corner cube array is a type of retroreflective layer which reflects incident light at a plurality of reflective surfaces, thus causing the light to be reflected back in its original direction, irrespective of the incident direction. Therefore, by using a corner cube array, it becomes possible to avoid the so-called "pale-black" phenomenon, i.e., a phenomenon where reflected light of the ambient light enters the eyes of a viewer and increases the brightness of dark displaying. When a corner cube array is observed, the viewer is observing the light which has gone out of his or her own pupils. According to the principle, when a corner cube array is used, ambient light does not affect the quality of dark displaying, and thus it is possible to prescribe a high reflectance for the inner slopes of the corner cubes. This also enables an improvement on the luminance in bright displaying.

Figure 13:
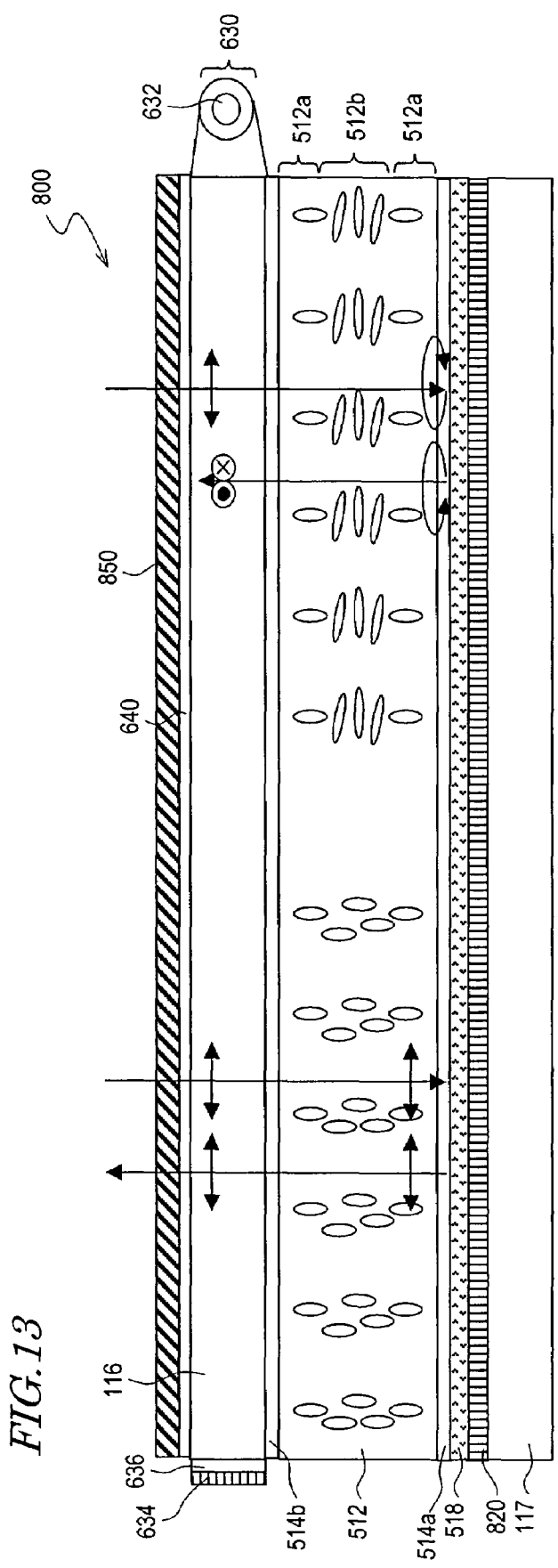
FIG. 13 A schematic diagram for explaining the construction and operation of still another fluorescent display device 800 according to an embodiment of the present invention.

Next, with reference to FIG. 13, the construction and operation of another fluorescent display device 800 according to an embodiment of the present invention will be described. Through a similar operation to that of the fluorescent display device 600, the fluorescent display device 800 presents display by utilizing fluorescence, and also operates as a reflection type liquid crystal display device. The left-hand side of FIG. 13 shows a state in the absence of an applied voltage, and the right-hand side shows a state under an applied voltage.

The fluorescent display device 800 differs from the fluorescent display device 600 in that a reflective layer 820 is provided between a fluorophore layer 518 and a rear substrate 117, and further a polarizer 850 is disposed on the viewer's side of the front substrate 116.

In the absence of an applied voltage (left-hand side in the FIGURE), the liquid crystal layer 512 is in a vertically aligned state, and therefore the linearly-polarized light having been transmitted through the polarizer 850 passes through the liquid crystal layer 512 while remaining linearly polarized, and also after being reflected by the reflector 820, the linearly-polarized light again passes through the liquid crystal layer 512 and the polarizer 850 while remaining linearly polarized, so as to be emitted toward the viewer's side. This constitutes bright displaying.

Under an applied voltage (right-hand side in the FIGURE), the liquid crystal molecules in an intermediate layer 512b of the liquid crystal layer 512 take tilted orientations. Assuming a retardation which is ¼ of the wavelength, the liquid crystal molecules impart a phase difference of 90° to the linearly-polarized light, which is thus converted into circularly polarized light (e.g., clockwise circularly polarized light). The circularly polarized light is reflected by the reflective layer 820 to become circularly polarized light having the opposite rotation (e.g., counterclockwise circularly polarized light), and is converted into linearly-polarized light when again passing through the liquid crystal layer 512. At this time, the polarization direction of the linearly-polarized light is a direction which is orthogonal to the transmission axis (the axis of polarization of the incident linearly-polarized light) of the polarizer 850, and thus is absorbed by the polarizer 850. This constitutes dark displaying.

Thus, the fluorescent display device 800 also functions as a reflection type liquid crystal display device which conducts bright displaying in the absence of an applied voltage, or conducts dark displaying under an applied voltage. Moreover, in a manner similar to the aforementioned fluorescent display device 600, the fluorescent display device 800 conducts bright displaying in the absence of an applied voltage by using fluorescence, or conducts dark displaying under an applied voltage. In other words, the fluorescent display device 800 is a self-light-emitting type fluorescent display device and yet a reflection type liquid crystal display device, being capable of simultaneously presenting display by utilizing fluorescence and display by utilizing ambient light.

Note that, in order to present paper-white display in the reflection mode, it is preferable to employ a diffusing reflector (scattering reflector) for the reflector 820. Instead of employing a diffusing reflector, a diffuser may be separately provided in addition to a reflector, or a light diffusing ability may be conferred to a color filter.

Similarly to the liquid crystal display device 200 shown in FIG. 6, the aforementioned display devices 500 to 800 for presenting display by utilizing fluorescence are constructed by using a vertical-alignment type liquid crystal layer composed of liquid crystal molecules having negative dielectric anisotropy, where a voltage is applied via a pair of electrodes which are provided on the front face and the rear face of the liquid crystal layer. However, without being limited thereto, a vertical-alignment type liquid crystal layer composed of liquid crystal molecules having positive dielectric anisotropy may be used and a lateral electric field may be applied, as in the liquid crystal display device shown in FIG. 5A. A horizontal-alignment type liquid crystal layer may be used as shown in FIG. 7 or FIG. 8.

Hereinafter, the present invention will be described with respect to Examples. In the following Examples, 2-inch diagonal TFT-type display devices were produced. A TFT substrate was used as the rear substrate.

EXAMPLE 1

The fluorescent display device 600 shown in FIG. 10 was produced as follows.

As the front substrate 116, a glass substrate having a refractive index of 1.6 was used. As the light source 632, an LED light source for emitting 405 nm light was used. As an excitation light cut filter, a film which only absorbs 405 nm light was used. As the light absorbing layer 120, a black resin layer was used.

The liquid crystal layer 512 had a thickness (cell thickness) of 5 µm. As the liquid crystal material, a negative type liquid crystal material MS-011105 (manufactured by Merck Ltd.) having Δn=0.13 was used, to which a chiral agent was mixed so as to obtain a twist angle of 180°.

The fluorophore layer 518 was produced by an aqueous solution technique described in Gao et al., Journal of Physical Chemistry B, vol. 102, p. 8360 (1998).

As a glass precursor solution containing ultrafine particles exhibiting red emission, a solution was used which was obtained by adding a cadmium telluride solution to an emulsion containing tetraethoxysilane and stirring it for 1 hour.

As a glass precursor solution containing ultrafine particles exhibiting green emission, a glass precursor solution was used which was obtained in a similar manner to the aforementioned production method for the glass precursor solution containing ultrafine particles exhibiting red emission, except for employing a solution containing cadmium telluride in a particle size of about 3 nm, which was obtained by reducing the reflux time to about 10 minutes in the production method for a cadmium telluride solution described in the aforementioned document.

As a glass precursor solution containing ultrafine particles exhibiting blue emission, that which was produced by a similar method was used, where zinc selenide was employed instead of cadmium telluride. About 20 hours of reflux time was required for production.

Next, with a dispenser, the above glass precursor solutions were applied onto a glass substrate (rear substrate), and a heat treatment was performed at 200° C. for 100 hours in an inert atmosphere, whereby a fluorophore layer 518 composed of glass in which ultrafine particles of fluorophores were uniformly dispersed was obtained.

EXAMPLE 2

The fluorescent display device 700 shown in FIG. 11 was produced.

As the reflective layer 717, as shown in FIG. 12, a reflective layer 717 was formed by the following method, which had a reflective film composed of a metal with a reflectance of about 30% on the slopes 717b of the recesses 717a in the form of rectangular pyramids having a vertex angle of 70°.

First, wet etching was performed for a silicon (100) substrate, thus producing a template of a predetermined shape.

Next, a resin layer was formed on the rear substrate 117 by using a negative type resist (MP107 manufactured by Mitsubishi Rayon Co., Ltd.), and rectangular pyramid recesses having a vertex angle of 70° were formed in this resin layer via transfer from the aforementioned template.

Thereafter, a tantalum film having a thickness of 300 nm was formed on the resin layer, and a silicon nitride film having a thickness of 50 nm was formed thereon, thus obtaining a reflective film having a reflectance of 30%.

COMPARATIVE EXAMPLE

A conventional transmission type liquid crystal display device was used as a display device of Comparative Example. As a light source for an edge light-type backlight, a single white LED light source was used.

The display devices of Examples 1 and 2 and Comparative Example were all 2-inch diagonal, and a current of 20 mA, with a voltage of 4 V, was flowed through an LED which was a light source of the illuminator of each.

Results of evaluating the frontal luminance of each display device are shown in Table 1. The frontal luminance was evaluated in each of the following cases: the entire surface was displayed in white or in any of the colors of red, green, and blue (solid fill displaying); or white was displayed inside and black was displayed outside, thus resulting in a frame accounting for a 50% area (white-in-frame displaying).

From the results of Table 1, it can be seen that the display device of Example 1 provides hardly any luminance improving effect over the display device of Comparative Example with respect to all-white displaying, but exhibits a luminance improving effect in the other manners of displaying.

In any manner of displaying, the display device of Example 2 exhibits a luminance improving effect over the display device of Comparative Example, as well as a luminance improving effect of 1.5 times or more over the display device of Example 1.

TABLE 1

|  | Example 1 | Example 2 | Conventional Product |
|---|---|---|---|
| All White | 51 cd/m² | 78 cd/m² | 50 cd/m² |
| White in Frame | 98 cd/m² | 153 cd/m² | 50 cd/m² |
| All Red | 23 cd/m² | 40 cd/m² | 13 cd/m² |
| All Green | 56 cd/m² | 87 cd/m² | 27 cd/m² |
| All Blue | 23 cd/m² | 36 cd/m² | 10 cd/m² |

EXAMPLE 3

The fluorescent display device 800 shown in FIG. 13 was produced.

The liquid crystal layer 512 had a thickness of 5.6 µm. As the reflective layer 820, a diffusing reflector was used. Otherwise, a liquid crystal display device having the same construction as that of the display device of Example 1 was provided, and the polarizer 850 was disposed on the outermost surface thereof.

It was confirmed that the resultant fluorescent display device 800 is capable of simultaneously presenting display by using fluorescence and display by using ambient light.

The above-described fluorescent display devices 500 to 800 are display devices whose front substrate serves as a light guiding plate (hereinafter referred to as a "frontlight-type"). However, a display device whose rear substrate serves as a light guiding plate (hereinafter referred to as a "backlight-type") can also be constructed. In the case of the frontlight-type, only an edge light-type illuminator, which is to be disposed at an end face of the display panel, can be employed as the light source, and this hinders application to large-sized display devices from the standpoint of light amount. However, adopting the backlight-type makes it possible to dispose the light source in the plane of the display panel, whereby constraints concerning the number of light sources are greatly alleviated, which is advantageous from the standpoint of light amount.

Hereinafter, with reference to FIG. 14 and FIG. 15, the structure and operation of another backlight-type fluorescent display device 900 according to an embodiment of the present invention will be described.

FIG. 14 is a schematic diagram for explaining the construction and operation of a fluorescent display device 900. FIGS. 15(a) and (b) are schematic diagrams for describing the construction of a reflecting structure 935 used for the fluorescent display device 900. Herein, as in the above examples, a construction will be illustrated in which, using a vertical-alignment type liquid crystal layer composed of liquid crystal molecules having negative dielectric anisotropy, a voltage is applied through a pair of electrodes which are provided on the front face and the rear face of the liquid crystal layer. Without being limited to this, a construction may be used in which a lateral electric field is applied across a vertical-alignment type liquid crystal layer composed of liquid crystal molecules having positive dielectric anisotropy as in the liquid crystal display device shown in FIG. 5A, or a horizontal-alignment type liquid crystal layer may be used as shown in FIG. 7 or FIG. 8.

As shown in FIG. 14, the fluorescent display device 900 includes a liquid crystal layer 912, pixel electrodes 614a and a counter electrode 914b for applying a voltage across the liquid crystal layer 912, and an illuminator (backlight) 930 for emitting light toward a principal face of the liquid crystal layer 912 at the rear face side (i.e., the opposite side to the viewer's side). The liquid crystal layer 912 is provided between a front substrate 916 and a rear substrate 917, such that the rear substrate 917 serves also as a light guiding plate for the illuminator 930. The front substrate 916 and the rear substrate 917 have a thickness of 0.7 mm, for example, and the rear substrate 917 has a refractive index of about 1.6, for example. A fluorophore layer 918 is provided on the side of the front substrate 916 facing the liquid crystal layer 912, such that the liquid crystal layer 912 controls whether the light which has been emitted from the backlight 930 is to enter the fluorophore layer 918 or not. For the fluorophore layer 918 and the liquid crystal layer 912, a fluorophore layer which emits red, green, and blue fluorescence can be formed in a similar manner to the above-described examples, for example. A cut filter 940 for absorbing excitation light (e.g., ultraviolet of 405 nm) is disposed on the front face of the front substrate 916. The construction of the illuminator 930 will be described later.

The front substrate 916 includes circuit elements (TFT elements, wiring line, etc.) 913 for controlling the voltage to be applied across the liquid crystal layer 912, such that the fluorophore layer 918 is provided in the region where these are not formed.

On the side of the fluorophore layer 918 facing the liquid crystal layer 912, resin structures 902 are provided. The resin structures 902 are formed of a resin whose refractive index is approximately equal to the extraordinary refractive index ne of the liquid crystal material of the liquid crystal layer 912 (e.g., 1.6 to 1.7), and may further contain fine particles. Each resin structure 902 has a thickness of 5 µm to 15 µm (e.g., 10 µm), and is sized within the display surface (size defined by the side faces of the fluorophore layer 918) as a rectangle each of whose sides is 10 µm to 40 µm long (e.g., a square of 25 µm×25 µm), thus presenting a shape of a rectangular pyramid having a bottom face in the fluorophore layer 918 and a top surface at the liquid crystal layer 912 side.

The side faces of the resin structures 902 are slanted with respect to the display surface by an angle of tilt α (within 45°±5°, preferably within 45°±3°). The resin structures 902 can be produced by a known photolithography technique by using a photosensitive resin, for example. One resin structure 902 or two or more resin structures 902 are to be formed in each pixel (e.g., each pixel of R, G, or B). FIG. 14 illustrates an example where one resin structure 902 is formed for each row direction of pixels.

On the slanted side faces of the resin structure 902, reflective layers 903 are provided. Each reflective layer 903 is formed of an aluminum film, for example. If each reflective layer 903 is formed by using an electrically conductive material, it can serve also as an electrical connection wiring between a circuit element 913 (e.g., a drain electrode of a TFT) and a pixel electrode 914a. The reflective layers 903 can be formed by using a known thin film deposition technique and a known photolithography technique.

A planarization layer 904 is formed on the side of each circuit element 913 facing the liquid crystal layer 912. The planarization layers 904 are formed by, for example, applying a transparent resin after forming the reflective layers 903 on the slanted side faces of the resin structures 902. At this time, if the transparent resin covers the reflective layers 903 on the top surfaces of the resin structures 902, the electrical connection between pixel electrodes 914a to be subsequently formed and the reflective layers 903 will be hindered. Therefore, any transparent resin covering the reflective layers 903 on the top surfaces of the resin structures 902 is removed.

On the top surfaces of the resin structures 902, pixel electrodes 914a composed of a transparent conductive layer are formed by a known method. As the transparent conductive layer, ITO or IZO can be used. A layer having a lower refractive index than the extraordinary refractive index ne of the liquid crystal material of the liquid crystal layer 912, e.g., a silicon oxide layer 915, is provided on the side of the planarization layer 904 facing the liquid crystal layer 912. The silicon oxide layer 915 prevents the light which has traveled through the liquid crystal layer 912 from entering the circuit elements 913 (i.e., so that the light having traveled through the liquid crystal layer 912 is reflected at the interface). In particular, in the case of a normally-white mode (NW mode) display device, it is preferable to provide the silicon oxide layer 915 for shielding because the contrast ratio would decrease if light were transmitted through the region where the circuit elements 913 are formed. Moreover, a gap may exist between the silicon oxide layer 915 and the pixel electrodes 914a. However, from the standpoint of the aperture ratio (efficiency of light utilization) of the display device, each pixel electrode 914a is preferably large, and is preferably formed on substantially the entire surface of the top surface of the resin structure 902. Note that predetermined alignment films (not shown) are provided on the surfaces of the pixel electrodes 914a and the silicon oxide layer 915 and the counter electrode 914b facing the liquid crystal layer 912.

Next, the construction of the backlight 930 will be described.

The backlight 930 includes the rear substrate 917 functioning as a light guiding plate and a light guiding plate 920 provided on the rear face thereof. Herein, the light guiding plate 920 has the same refractive index (about 1.6) as the refractive index of the rear substrate 917, and the light guiding plate 920 and the rear substrate 917 are in direct contact without any intervening low-refractive index substance, so as to together function as a light guiding plate. The rear substrate 917 and the light guiding plate 920 may be formed of the same material, and may be integrally formed.

The light guiding plate 920 is a light guiding plate of a parallel plate type which has holes (recesses) 921 in the rear face thereof, the holes (recesses) 921 having generally vertical side faces. Reflecting structures 935 are provided within the holes 921 in the light guiding plate 920. Moreover, a light absorbing layer 937 is disposed on the rear face side of the light guiding plate 920. The light guiding plate 920 and the light absorbing layer 937 are disposed with an adhesion layer 938 having a low refractive index interposed therebetween. Instead of the adhesion layer 938, an air layer may be formed. By ensuring that the light propagating within the light guiding plate 920 is totally reflected at the interface with the adhesion layer (air layer) 938, the efficiency of light utilization can be enhanced. For similar purposes, it is preferable to form reflective interfaces at the end faces of the light guiding plate 920 and the rear substrate 917. For example, reflective layers may be provided at the end faces of the light guiding plate 920 and the rear substrate 917. Moreover, the light absorbing layer 937 absorbs ambient light. By providing the light absorbing layer 937, it becomes possible to conduct good dark displaying.

The light absorbing layer 937 has apertures in positions corresponding to the holes 921 in the rear face of the light guiding plate 920. In the rear face of the light absorbing layer 937, a plurality of light sources (e.g., LEDs) 932 are provided for emitting excitation light (e.g., ultraviolet of 405 nm) for the fluorophore layer 918 toward the reflecting structures 935 within the holes 921 in the light guiding plate 920. Between each light source 932 and each reflecting structure 935 is air, for example. The density with which the light sources 932 are provided may be set according to the required light amount, and the like. However, the distance between adjoining light sources 932 is preferably about 50 mm to about 100 mm, for example. This is in order to ensure that the proportion of light propagating within the light guiding plate 920 and the rear substrate 917 falls within an appropriate range.

Figure 15:
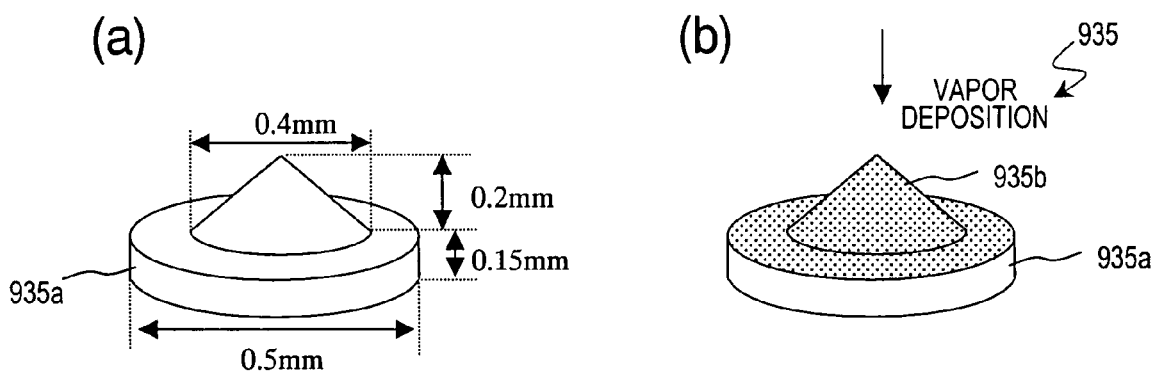
FIGS. 15(a) and (b) are schematic diagrams for explaining the construction of a reflecting structure 935 which is used for the fluorescent display device 900.

As shown in FIG. 15, the reflecting structure 935 includes a main body 935a having a light absorbing function and a reflective layer 935b provided on the surface of the main body 935a. The main body 935a has a conical side face, and the reflective layer 935b provided on the side face reflects the excitation light having been emitted from the light source 932 to be guided into the light guiding plate 920. The main body 935a, which has a light absorbing function, of the having reflecting structure 935 faces the liquid crystal layer 912, such that it appears black when viewed from the front substrate 916. The reflecting structure 935 is caused to adhere to the light guiding plate 920 (refractive index about 1.6) with a colorless and transparent adhesive (not shown) having a refractive index of about 1.5, for example.

The angle of tilt β of the reflective layer 935b of each reflecting structure 935 with respect to the display surface is prescribed to be about 45°±5°, such that the excitation light which is emitted from the light source 932 is reflected essentially in parallel to the display surface.

The angle of tilt γ of the side face of each hole 921 in the light guiding plate 920 with respect to the display surface is set at about 60°, such that the principal ray of the excitation light which has been reflected by the reflective layer 935b enters the side face of the hole 921 essentially perpendicularly. At this time, the excitation light enters from the air (which is a medium having a small refractive index) into the light guiding plate 920, and therefore the excitation light enters the light guiding plate 920 without having much expanse. The excitation light having entered the light guiding plate 920 propagates within the light guiding plate 920 and the rear substrate 917, while repeating reflections at the interface between the light guiding plate and the adhesion layer (air layer) 938, the interfaces between the air and the end faces of the light guiding plate and the rear substrate 917 and the principal face of the rear substrate 917 facing the liquid crystal layer 912, and the interface between the light guiding plate 920 and the adhesion layer (having a refractive index of about 1.5) via which the reflecting structure 935 and the light guiding plate 920 adhere to each other.

The light guiding plate 920 has a thickness of 0.7 mm, for example. Each hole 921 provided in the light guiding plate 920 has a depth of about 0.6 mm, for example, and is in a circular form with a diameter of 0.7 mm. The diameter of each aperture provided in the light absorbing layer 937 is preferably slightly larger than the light-emitting portion of the light source 932. In the case where an LED whose light-emitting portion has a diameter of 0.3 mm is used as each light source 932, each aperture (throughhole) in the light absorbing layer 937 has a diameter of about 0.5 mm.

Each reflecting structure 935 has a structure as shown in FIGS. 15(*a*) and (*b*), for example. The main body 935a is produced by molding acrylic resin containing a black pigment, for example, and is shaped so that a cone having a height 0.2 mm and an angle of tilt of about 45 (45°±5°) is stacked on a disk having a diameter of 0.5 mm and a thickness of 0.15 mm. As shown in FIG. 15(*b*), by vapor-depositing a metal film having a high reflectance such as silver or aluminum on the surface of the main body 935a where the cone is provided, the reflecting structure 935 having the reflective layer 935b is obtained. Although a cone is preferable for reflecting excitation light in an isotropic manner within the display surface, it may also be a polypyramid. In this case, the side faces of each hole 921 are preferably disposed so as to oppose the reflective surfaces.

The basic operation principles of the fluorescent display device 900 are similar to those of the fluorescent display devices in the earlier examples, and will be described briefly.

The excitation light propagating through the light guiding plate 920 and the rear substrate 917 enters the liquid crystal layer 912 across which no voltage is being applied, and passes through the liquid crystal layer 912 (e.g., FIG. 5A). The excitation light (ray 1 in the FIGURE) having passed through the liquid crystal layer 912 strikes the resin structure 902, and a portion thereof is reflected by a reflective layer 903 and enters the fluorophore layer 918, so as to be converted into visible light and emitted toward the viewer's side (ray 1' in the FIGURE). A portion of the excitation light striking the resin structure 902 is reflected at the interface between the resin structure 902 and the fluorophore layer 918, and thereafter reflected by the reflective layer 903 to enter the fluorophore layer 918. On the other hand, the excitation light entering the liquid crystal layer 912 with a voltage being applied thereto is reflected within the liquid crystal layer 912 (e.g., FIG. 5A), and again propagates within the rear substrate 917 and the light guiding plate 920 (ray 3 in the FIGURE). Moreover, the light entering the silicon oxide layer 915 is reflected at the interface between the silicon oxide layer 915 and the liquid crystal layer 912, and again propagates within the rear substrate 917 and the light guiding plate 920 (ray 2 in the FIGURE). Thus, by using the vertical-alignment type liquid crystal layer 912 composed of a nematic liquid crystal material having negative dielectric anisotropy, it is possible to present display in the NW mode.

Any of the above-described combinations of liquid crystal layers and polarized light can be adopted, but it is particularly preferable to construct an NW mode display device employing a vertical-alignment type liquid crystal layer. The reason is that, when a vertical-alignment type liquid crystal layer is used, the apparent refractive index of liquid crystal molecules becomes independent of the direction (direction in the display surface) of the excitation light entering the liquid crystal layer, so that the switching between a transmitting state or a non-transmitting state of excitation light becomes immune to the influence of the direction of excitation light.

Although LEDs which emit ultraviolet are used as the light sources 932 and this ultraviolet is used to cause red, green, and blue fluorophores to emit light, this is not a limitation. For example, blue LEDs may be used to excite fluorophores which emit green and red light, and a material which moderately scatters blue light may be used for the blue color.

INDUSTRIAL APPLICABILITY

According to the present invention, there is provided a display device which is capable of presenting display by switching between a transmitting state and a non-transmitting state with respect to light entering the liquid crystal layer, with a voltage which is low enough to permit use of conventional transistors. The display device according to the present invention can also be used as a direct-viewing type display device.

The invention claimed is:

1. A display device comprising:
   a liquid crystal layer having a first principal face and a second principal face opposing each other;
   a plurality of electrodes for applying a voltage across the liquid crystal layer;
   a fluorophore layer provided on the first principal face side of the liquid crystal layer; and
   an illuminator for emitting light for exciting the fluorophore layer toward the second principal face of the liquid crystal layer, wherein,
   when a predetermined voltage is applied, the liquid crystal layer forms an intermediate layer containing liquid crystal molecules which are oriented in a different direction from that of liquid crystal molecules in an anchoring layer near the second principal face, and causes linearly-polarized light which has been transmitted through the anchoring layer near the second principal face to be refracted toward the second principal face in or near the intermediate layer; and
   displaying is conducted by using light emitted by the fluorophore layer while no voltage is applied across the liquid crystal layer, and black displaying is conducted while a voltage is applied across the liquid crystal layer.

2. The display device of claim 1, wherein a refractive index of the intermediate layer with respect to the linearly-polarized light which has been transmitted through the anchoring layer is smaller than a refractive index of the anchoring layer.

3. The display device of claim 1, wherein the linearly-polarized light which is emitted from the illuminator toward the second principal face has a component which is parallel to major axes of the liquid crystal molecules in the anchoring layer.

4. The display device of claim 1, wherein,
   the liquid crystal layer is a vertical-alignment type liquid crystal layer containing liquid crystal molecules having positive dielectric anisotropy;
   the plurality of electrodes are a plurality of electrodes for applying a lateral electric field across the liquid crystal layer; and
   the linearly-polarized light is p-polarized light.

5. The display device of claim 1, wherein,
   the liquid crystal layer is a vertical-alignment type liquid crystal layer containing liquid crystal molecules having negative dielectric anisotropy;
   the plurality of electrodes are a plurality of electrodes disposed so as to oppose each other via the liquid crystal layer; and
   the linearly-polarized light is p-polarized light.

6. The display device of claim 1, wherein,
   the liquid crystal layer is a horizontal-alignment type liquid crystal layer containing liquid crystal molecules having positive dielectric anisotropy;
   the plurality of electrodes are a plurality of electrodes for applying a lateral electric field across the liquid crystal layer; and
   the linearly-polarized light is s-polarized light.

7. The display device of claim 1, wherein,
   the liquid crystal layer is a horizontal-alignment type liquid crystal layer containing liquid crystal molecules having positive dielectric anisotropy;
   the plurality of electrodes are a plurality of electrodes disposed so as to oppose each other via the liquid crystal layer; and
   the linearly-polarized light is s-polarized light.

8. The display device of claim 1, comprising a reflective layer on the opposite side of the fluorophore layer from the liquid crystal layer.

9. The display device of claim 8, wherein the reflective layer is a retroreflective layer.

10. The display device of claim 1, further comprising a light absorbing layer on the opposite side of the fluorophore layer from the liquid crystal layer.

11. The display device of claim 1, wherein the illuminator includes a light source and a light guiding plate.

12. The display device of claim 11, wherein the illuminator further includes a polarization-selective film between the light source and the light guiding plate.

13. The display device of claim 12, wherein the illuminator further includes a reflective layer disposed so as to oppose the light source via the light guiding plate.

14. The display device of claim 13, wherein the illuminator further includes a ¼ wavelength plate between the reflective layer and the light guiding plate.

15. The display device of claim 1, wherein the fluorophore layer is disposed on a front face side of the liquid crystal layer, and the illuminator is disposed on a rear face side of the liquid crystal layer.

16. The display device of claim 15, wherein, the illuminator includes:
a light guiding plate of a parallel plate type, having a plurality of holes on a rear face thereof;
a reflecting structure provided in each of the plurality of holes; and
a plurality of light sources each emitting light toward the reflecting structure.

17. The display device of claim 16, further comprising a light absorbing layer on the rear face side of the light guiding plate.

18. The display device of claim 17, wherein a layer having a lower refractive index than that of the light guiding plate is provided between the light guiding plate and the light absorbing layer.

* * * * *